(12) United States Patent
Satoh

(10) Patent No.: US 10,701,252 B2
(45) Date of Patent: Jun. 30, 2020

(54) IMAGING OPTICAL SYSTEM, IMAGING SYSTEM, AND IMAGING APPARATUS

(71) Applicant: Ricoh Company, Ltd., Tokyo (JP)

(72) Inventor: Hiroyuki Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/290,992

(22) Filed: Mar. 4, 2019

(65) Prior Publication Data
US 2019/0273848 A1 Sep. 5, 2019

(30) Foreign Application Priority Data

Mar. 5, 2018 (JP) .................................. 2018-038185
Jan. 18, 2019 (JP) .................................. 2019-006503

(51) Int. Cl.
| | | |
|---|---|---|
| *H04N 7/18* | (2006.01) | |
| *H04N 5/225* | (2006.01) | |
| *H04N 13/282* | (2018.01) | |
| *G02B 5/20* | (2006.01) | |
| *G02B 27/00* | (2006.01) | |
| *G03B 11/00* | (2006.01) | |
| *G03B 17/17* | (2006.01) | |
| *G03B 37/04* | (2006.01) | |
| *G02B 13/06* | (2006.01) | |
| *G02B 13/00* | (2006.01) | |
| *G02B 5/28* | (2006.01) | |

(52) U.S. Cl.
CPC ........... *H04N 5/2254* (2013.01); *G02B 5/208* (2013.01); *G02B 5/282* (2013.01); *G02B 13/0065* (2013.01); *G02B 13/06* (2013.01); *G02B 27/0018* (2013.01); *G03B 11/00* (2013.01); *G03B 17/17* (2013.01); *G03B 37/04* (2013.01); *H04N 13/282* (2018.05); *H04N 2213/001* (2013.01)

(58) Field of Classification Search
CPC .................................................. H04N 5/2254
USPC ............................................................ 348/38
See application file for complete search history.

(56) References Cited

U.S. PATENT DOCUMENTS

| | | | | |
|---|---|---|---|---|
| 4,922,282 A | * | 5/1990 | Koyama ................. | G02B 7/34 250/201.2 |
| 5,521,733 A | * | 5/1996 | Akiyama ........... | G02B 6/29362 398/48 |
| 6,462,866 B1 | * | 10/2002 | Sugiyama .............. | G02B 5/282 359/356 |
| 2006/0291061 A1 | * | 12/2006 | Iyama .................... | G02B 5/282 359/614 |

(Continued)

FOREIGN PATENT DOCUMENTS

| | | |
|---|---|---|
| JP | 2000-304918 | 11/2000 |
| JP | 2006-078672 | 3/2006 |

(Continued)

*Primary Examiner* — Leron Beck
(74) *Attorney, Agent, or Firm* — Xsensus LLP

(57) ABSTRACT

An imaging optical system includes two optical systems. The two optical systems each include an object-side filter and an image-side filter having different spectral characteristics. A wavelength of light for which the object-side filter has a spectral transmittance and a spectral reflectance of 50% is longer than a wavelength of light for which the image-side filter has a spectral transmittance and a spectral reflectance of 50%.

20 Claims, 20 Drawing Sheets

(56) References Cited

U.S. PATENT DOCUMENTS

| | | | |
|---|---|---|---|
| 2007/0182844 A1* | 8/2007 | Allman | G02B 5/04 348/345 |
| 2008/0173795 A1* | 7/2008 | Kang | H01L 27/14621 250/208.1 |
| 2008/0204740 A1* | 8/2008 | Berg | G01B 11/16 356/239.2 |
| 2011/0051260 A1* | 3/2011 | Nakayama | G02B 5/205 359/738 |
| 2011/0080636 A1* | 4/2011 | Nakanishi | G02B 5/223 359/359 |
| 2013/0050405 A1 | 2/2013 | Masuda et al. | |
| 2013/0050408 A1 | 2/2013 | Masuda et al. | |
| 2013/0057542 A1 | 3/2013 | Takenaka et al. | |
| 2013/0063754 A1 | 3/2013 | Saisho et al. | |
| 2013/0235149 A1 | 9/2013 | Tanaka et al. | |
| 2013/0242040 A1* | 9/2013 | Masuda | H04N 5/2254 348/36 |
| 2013/0326419 A1 | 12/2013 | Harada et al. | |
| 2014/0027653 A1* | 1/2014 | Mori | G02B 5/22 250/458.1 |
| 2014/0036031 A1 | 2/2014 | Tanaka et al. | |
| 2014/0071226 A1 | 3/2014 | Satoh et al. | |
| 2014/0071227 A1 | 3/2014 | Takenaka et al. | |
| 2014/0078247 A1 | 3/2014 | Shohara et al. | |
| 2014/0132709 A1 | 5/2014 | Satoh et al. | |
| 2014/0152852 A1 | 6/2014 | Ito et al. | |
| 2014/0176542 A1 | 6/2014 | Shohara et al. | |
| 2015/0015664 A1 | 1/2015 | Masuda et al. | |
| 2015/0015766 A1 | 1/2015 | Satoh et al. | |
| 2015/0042647 A1 | 2/2015 | Shohara et al. | |
| 2015/0062363 A1 | 3/2015 | Takenaka et al. | |
| 2015/0192762 A1 | 7/2015 | Satoh et al. | |
| 2015/0222816 A1 | 8/2015 | Shohara et al. | |
| 2015/0260888 A1* | 9/2015 | Yoshihara | G02B 5/26 359/359 |
| 2015/0268396 A1* | 9/2015 | Weber | G02B 5/282 359/359 |
| 2015/0301316 A1 | 10/2015 | Masuda et al. | |
| 2016/0006907 A1 | 1/2016 | Masuda et al. | |
| 2016/0147045 A1 | 5/2016 | Masuda et al. | |
| 2016/0182825 A1 | 6/2016 | Tanaka et al. | |
| 2016/0266359 A1 | 9/2016 | Amano et al. | |
| 2016/0313541 A1 | 10/2016 | Satoh et al. | |
| 2016/0337584 A1 | 11/2016 | Masuda et al. | |
| 2016/0341973 A1* | 11/2016 | Ida | G02B 27/58 |
| 2016/0353020 A1 | 12/2016 | Satoh | |
| 2017/0116704 A1 | 4/2017 | Takenaka et al. | |
| 2017/0257546 A1* | 9/2017 | Shahid | H04N 5/2254 |
| 2017/0270381 A1 | 9/2017 | Itoh et al. | |
| 2017/0310895 A1 | 10/2017 | Masuda et al. | |
| 2017/0315336 A1 | 11/2017 | Masuda et al. | |
| 2018/0024333 A1 | 1/2018 | Satoh et al. | |
| 2018/0213152 A1 | 7/2018 | Masuda et al. | |

FOREIGN PATENT DOCUMENTS

| | | |
|---|---|---|
| JP | 2007-206172 | 8/2007 |
| JP | 2014-056048 | 3/2014 |
| JP | 2016-009152 | 1/2016 |

* cited by examiner

FIG. 3
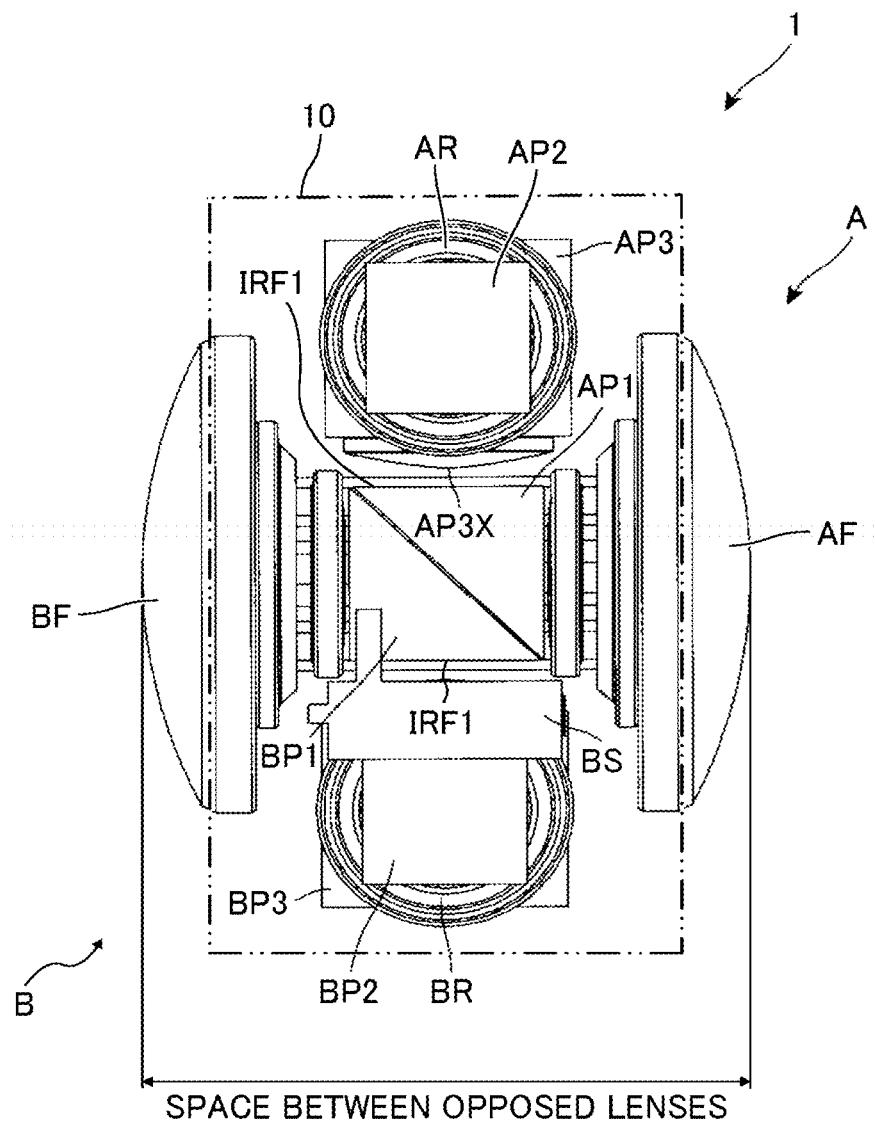
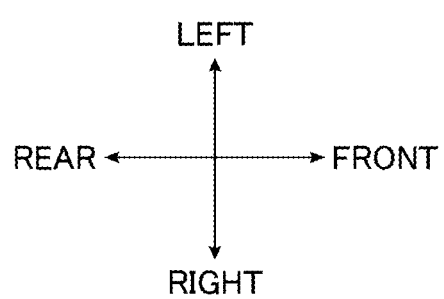

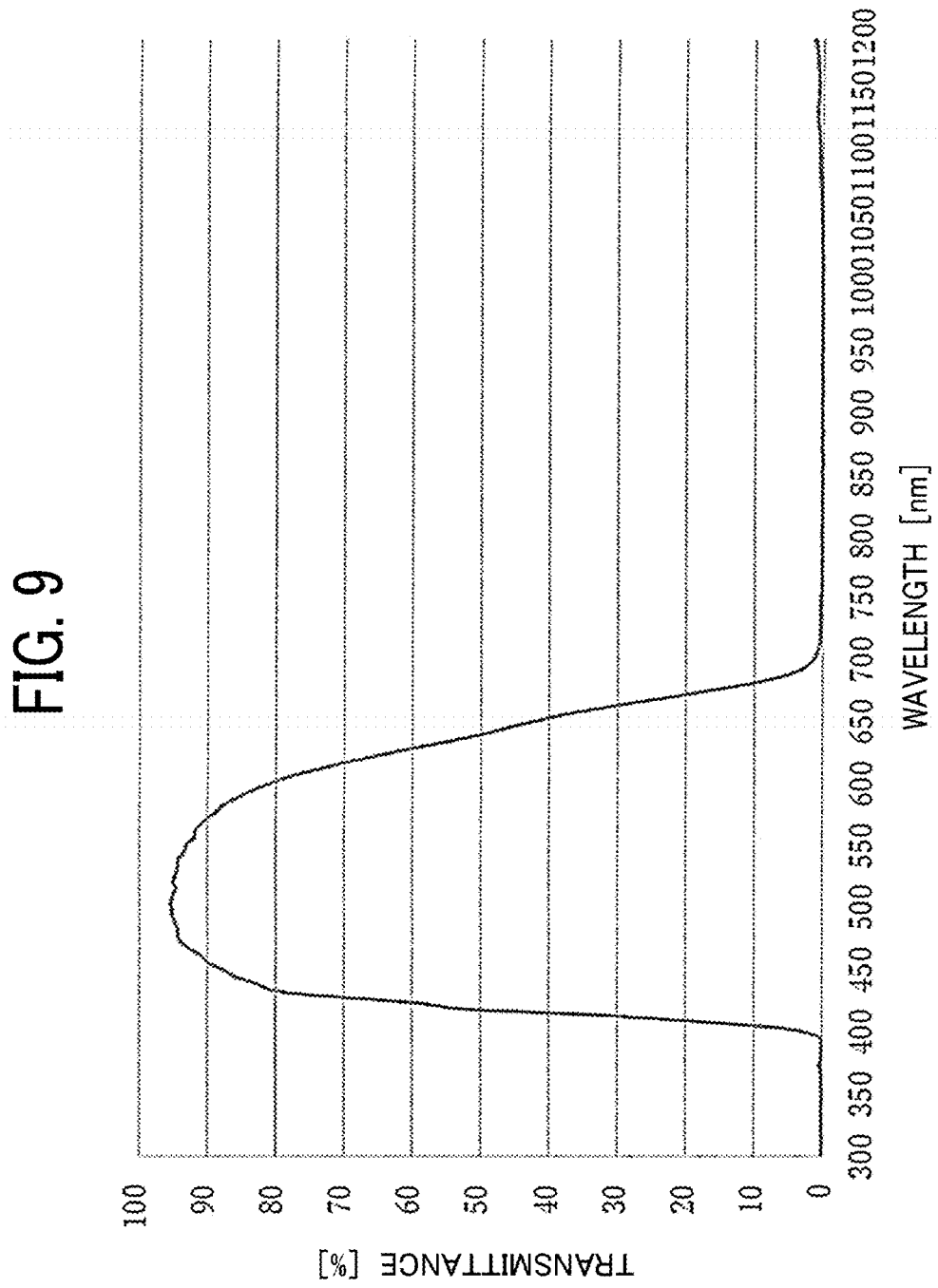

FIG. 14A
FIG. 14B
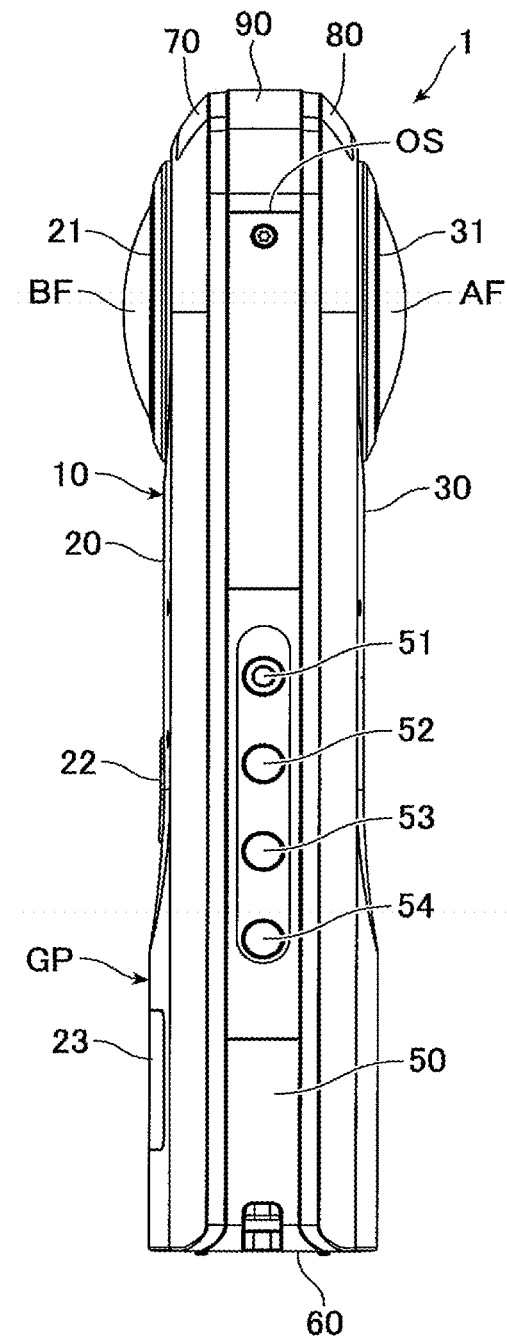
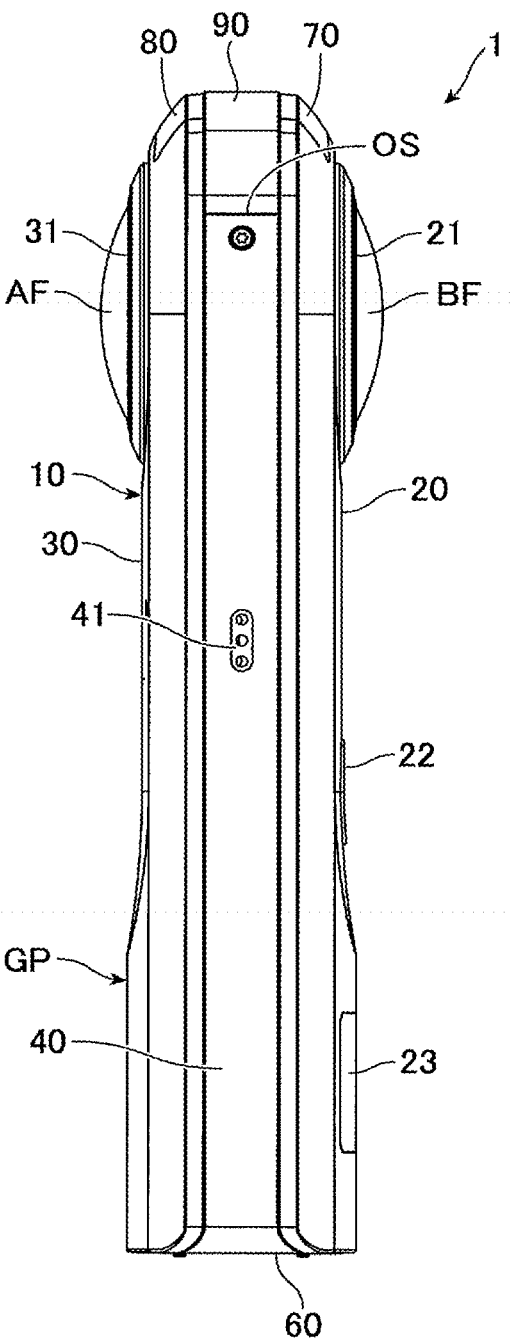

FIG. 16A
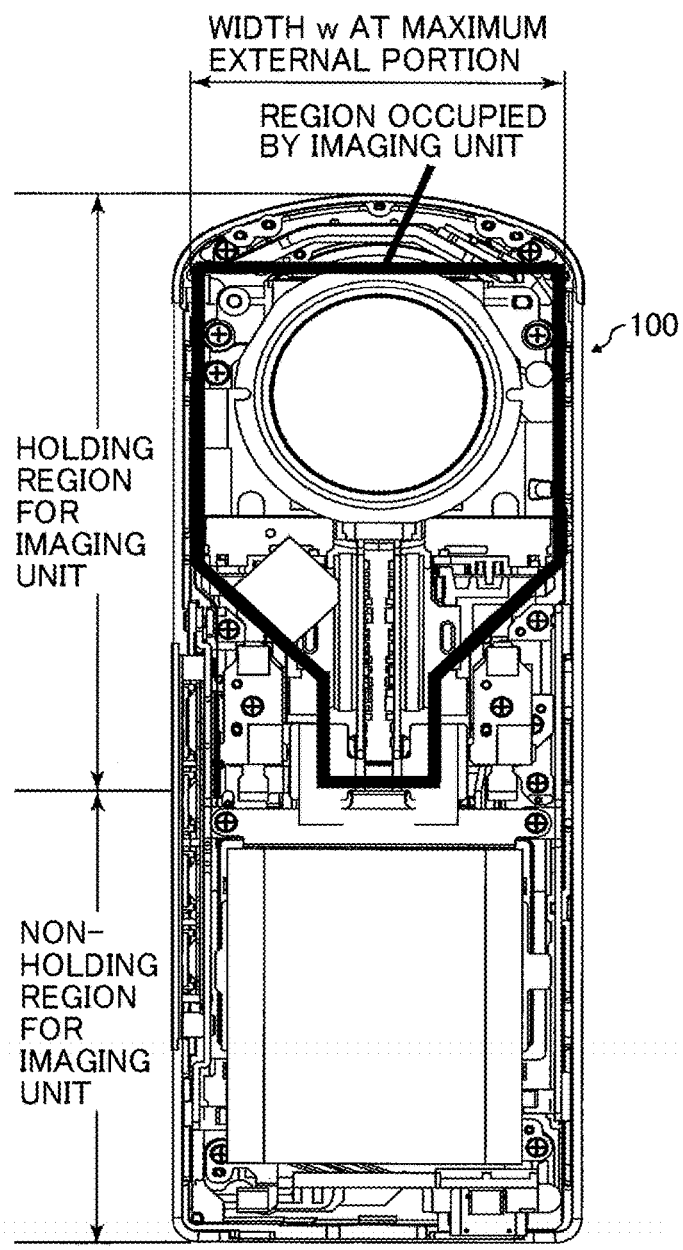
FIG. 16B
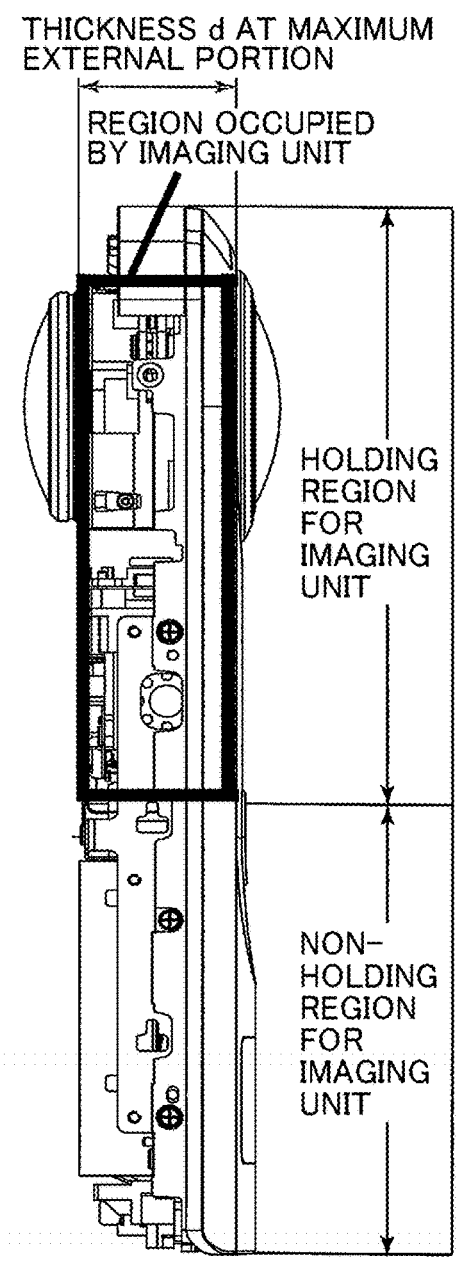
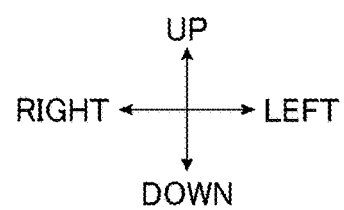
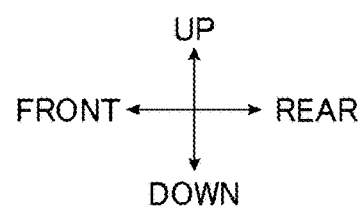

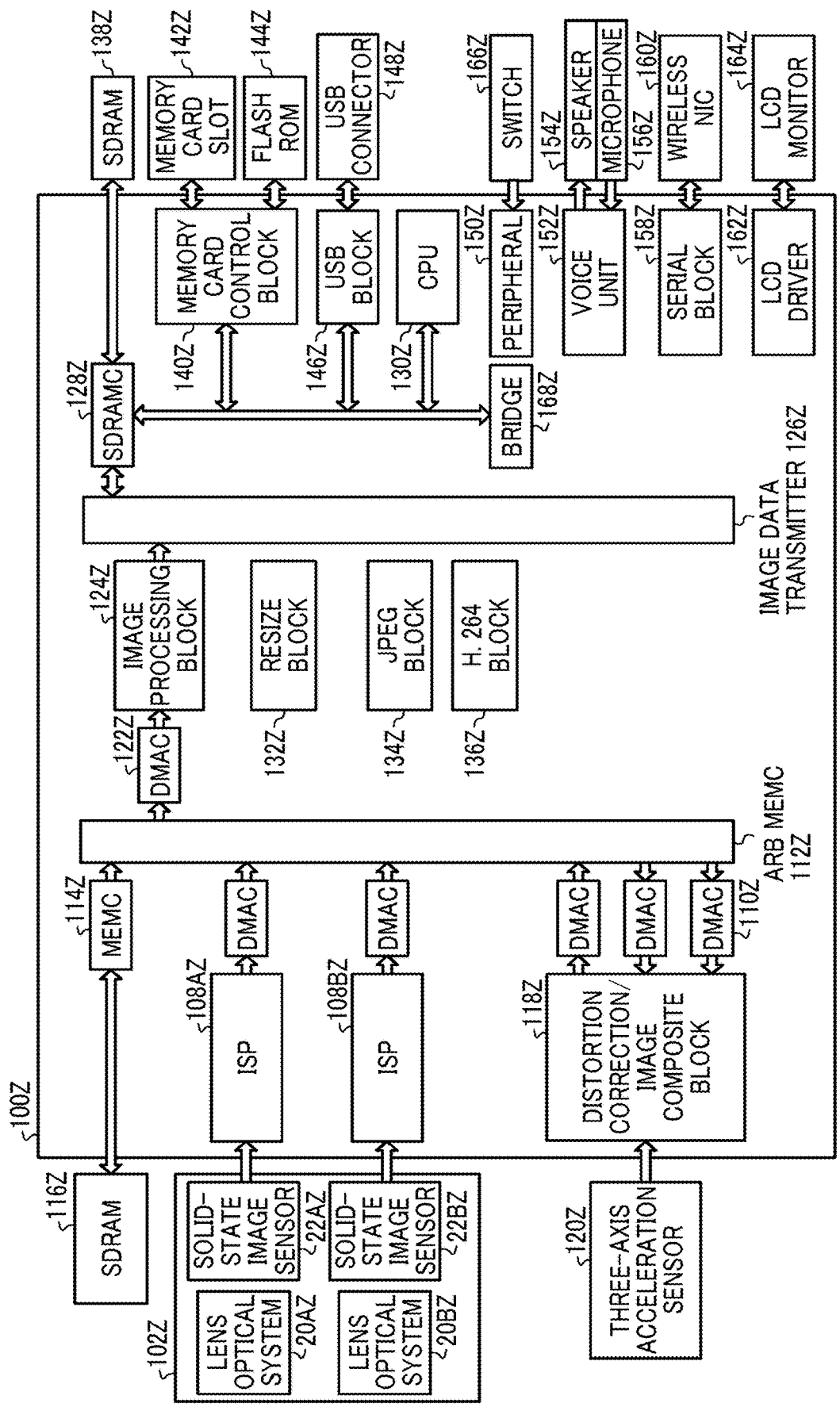

IMAGING OPTICAL SYSTEM, IMAGING SYSTEM, AND IMAGING APPARATUS

CROSS-REFERENCE TO RELATED APPLICATION

This patent application is based on and claims priority pursuant to 35 U.S.C. § 119(a) to Japanese Patent Application No. 2018-038185, filed on Mar. 5, 2018 and Japanese Patent Application No. 2019-006503, filed on Jan. 18, 2019, in the Japan Patent Office, the entire disclosure of which is hereby incorporated by reference herein.

BACKGROUND

Technical Field

Embodiments of the present disclosure relate to an imaging optical system, an imaging system, and an imaging apparatus.

Description of the Related Art

There is a need for such spherical imaging systems to reduce the disparity that corresponds to an overlapping area of two images joined together by calibration while making the system more compact (i.e., thinner). In order to meet this need, the spherical imaging systems are provided with a prism (reflecting plane) so as to reduce the distance (distance between maximum angle-of-view points) between positions at which light rays forming a maximum angle of view strike the lens closest to the object side in the two imaging optical systems.

However, with the above-described spherical imaging system, the hue of the image acquired by one wide-angle lens and one image sensor may differ from the hue of the image acquired by the other wide-angle lens and the other image sensor. The composite image of the two images may look unnatural. For example, when it is assumed that a spherical image in which both the outside and inside of a room are reflected is captured on a fine weather, sunlight is incident more on the wide-angle lens facing the outside and an image with a strong red component (R component) (reddish image) is acquired, and light of, for example, a light-emitting diode (LED) is incident more on the wide-angle lens facing the inside and an image with a strong green component and a strong blue component (G component and B component) (non-reddish image) is acquired. A joint portion (boundary portion) of the two images may give a mismatch feeling (see FIGS. 21A and 21B).

To prevent reddish cast resulting from the incident conditions of light on the long-wavelength side (for example, infrared), an infrared-cut filter (IR filter) may be provided on the wide-angle lens. However, the infrared-cut filter may reflect light and generate a ghost.

SUMMARY

The present disclosure is made in light of the above-described issues, and an object of the disclosure is to provide an imaging optical system, an imaging system, and an imaging apparatus capable of providing a high-quality image in which a ghost is not generated and the hue is natural.

An imaging optical system according to one aspect of the present disclosure includes two optical systems. The two optical systems each include an object-side filter and an image-side filter having different spectral characteristics. A wavelength of light for which the object-side filter has a spectral transmittance and a spectral reflectance of 50% is longer than a wavelength of light for which the image-side filter has a spectral transmittance and a spectral reflectance of 50%.

According to the aspect of the present disclosure, an imaging optical system, an imaging system, and an imaging apparatus capable of providing a high-quality image in which a ghost is not generated and the hue is natural can be provided.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 3 is a top view of the imaging system according to the embodiment;

FIG. 9 is a graph presenting an example of transmittances of an infrared-absorbing filter;

FIGS. 14A and 14B are external configuration views of the imaging system when viewed from right and left (right side view, left side view);

FIGS. 16A and 16B illustrate the positional relationship between a casing and an imaging unit when the casing is assembled with the imaging unit;

FIG. 20 is a diagram illustrating an example of a hardware configuration of the imaging system.

Figure 1:
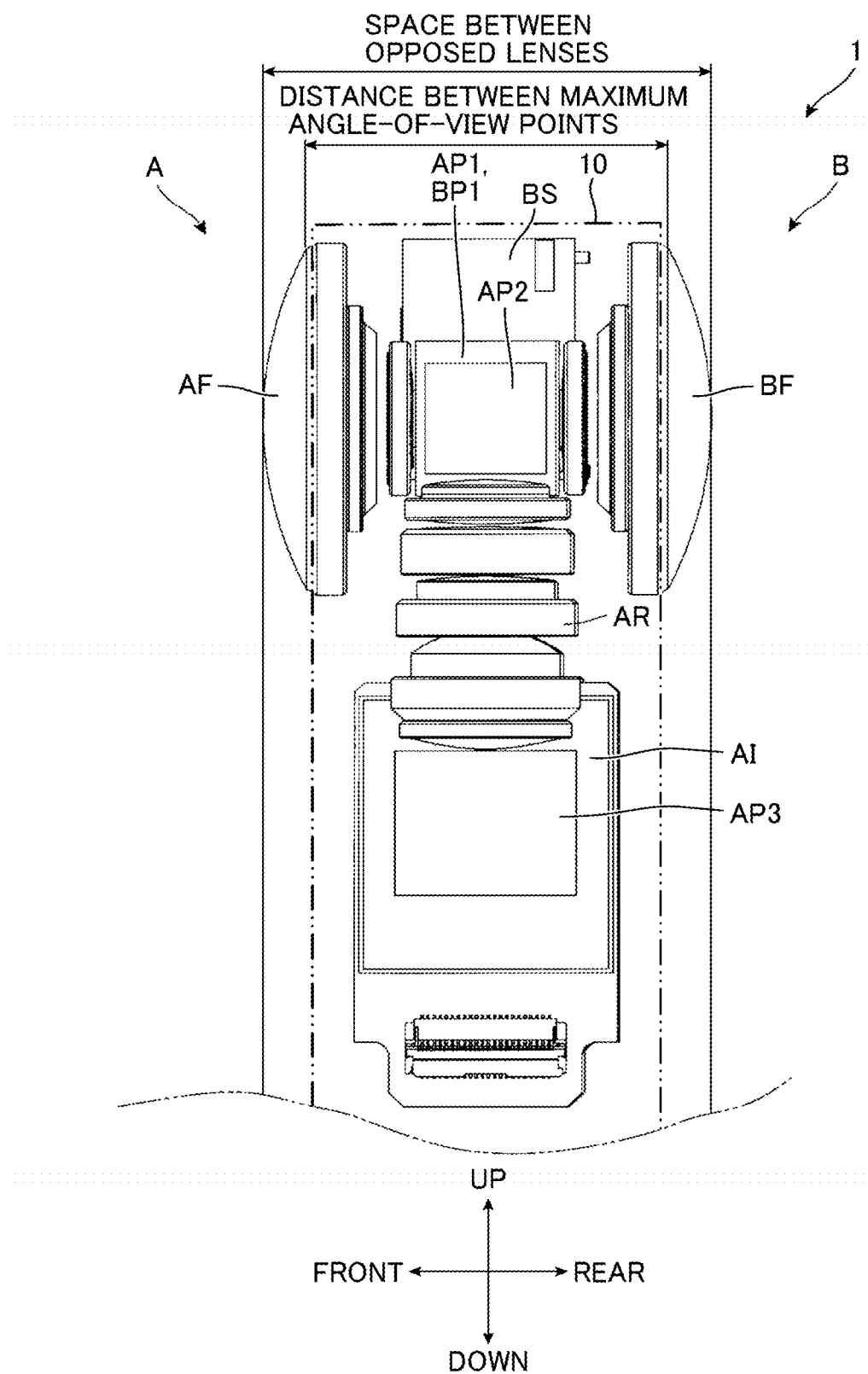
FIG. 1 is a left side view of an imaging system according to an embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An imaging system 1 according to an embodiment is described in detail with reference to FIGS. 1 to 20. In the following description, front, rear, upper (up), lower (down), left, and right directions are based on arrow directions written in the drawings.

Figure 2:
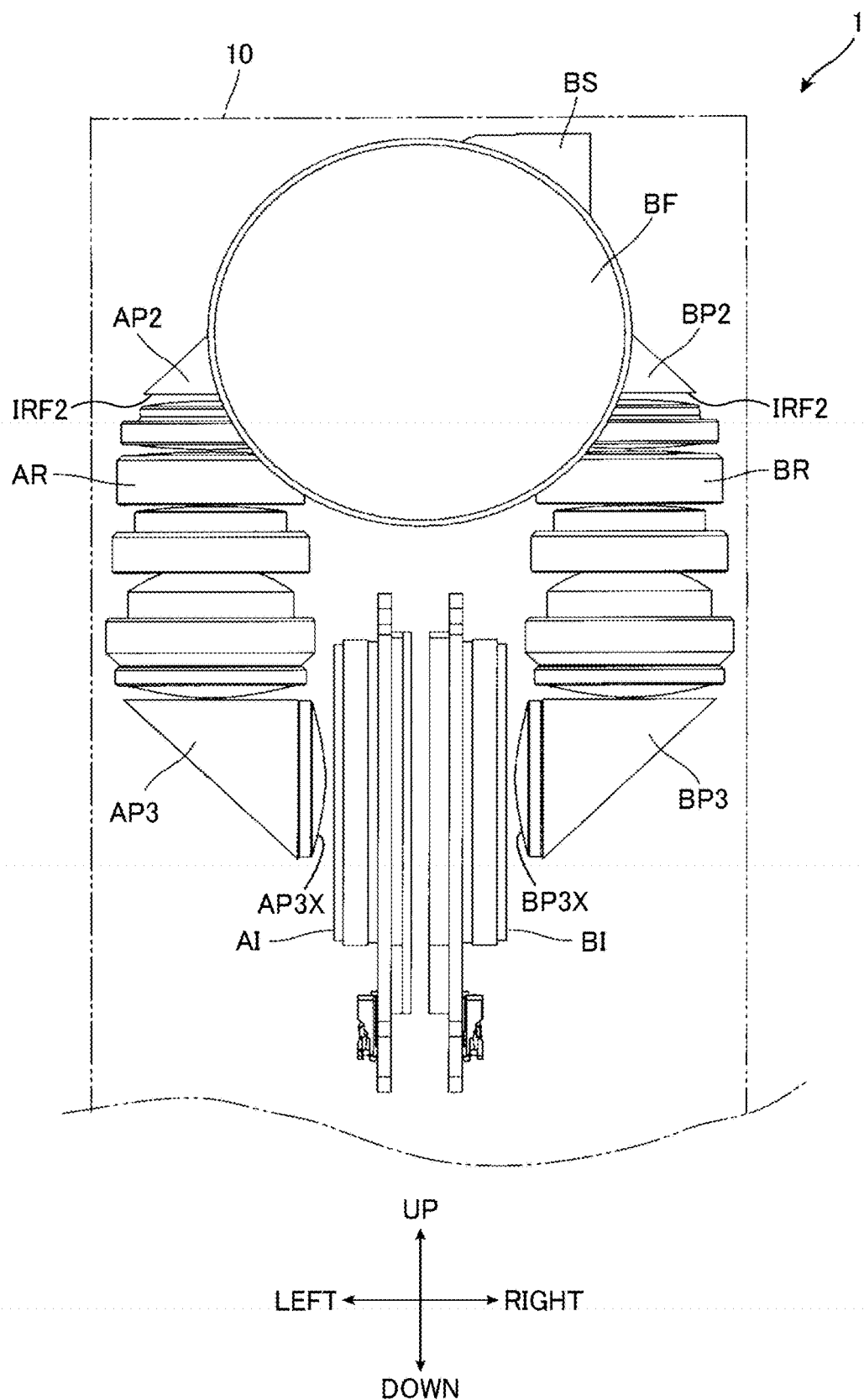
FIG. 2 is a rear view of the imaging system according to the embodiment.

The imaging system 1 includes two wide-angle lens systems (fish-eye lens systems, optical systems, imaging optical systems) A and B arranged symmetrically to each other (arranged such that lenses on the most object sides face in different directions), two image sensors AI and BI on which images via the two wide-angle lens systems A and B are formed, and a casing 10 that holds (houses) the two wide-angle lens systems A and B and the two image sensors AI and BI (in the casing 10). FIGS. 1 to 3 schematically illustrate the casing 10 with imaginary lines (two-dot chain lines). The two wide-angle lens systems A and B can have the same specifications, and the two image sensors AI and BI can have the same specifications. The wide-angle lens systems A and B each have a wide angle of view of more than 180°. The imaging system 1 can be a spherical imaging system in which images formed on the image sensors AI and BI are composited and hence an image within a 4-7c radian solid angle is formed.

The wide-angle lens system A includes, in the order from an object side toward an image side, a negative front group AF, a first prism (first reflector) AP1, a variable aperture stop (stop) AS, a second prism (second optical-path reflector) AP2, a positive rear group AR, and a third prism (third optical-path reflector) AP3. The negative front group AF has a function of taking in rays with a large angle of view of more than 180°. The positive rear group AR has a function of correcting aberration of a formed image. The variable aperture stop AS is not illustrated in FIGS. 1 to 3, but is illustrated in a development diagram of FIG. 4.

Figure 4:
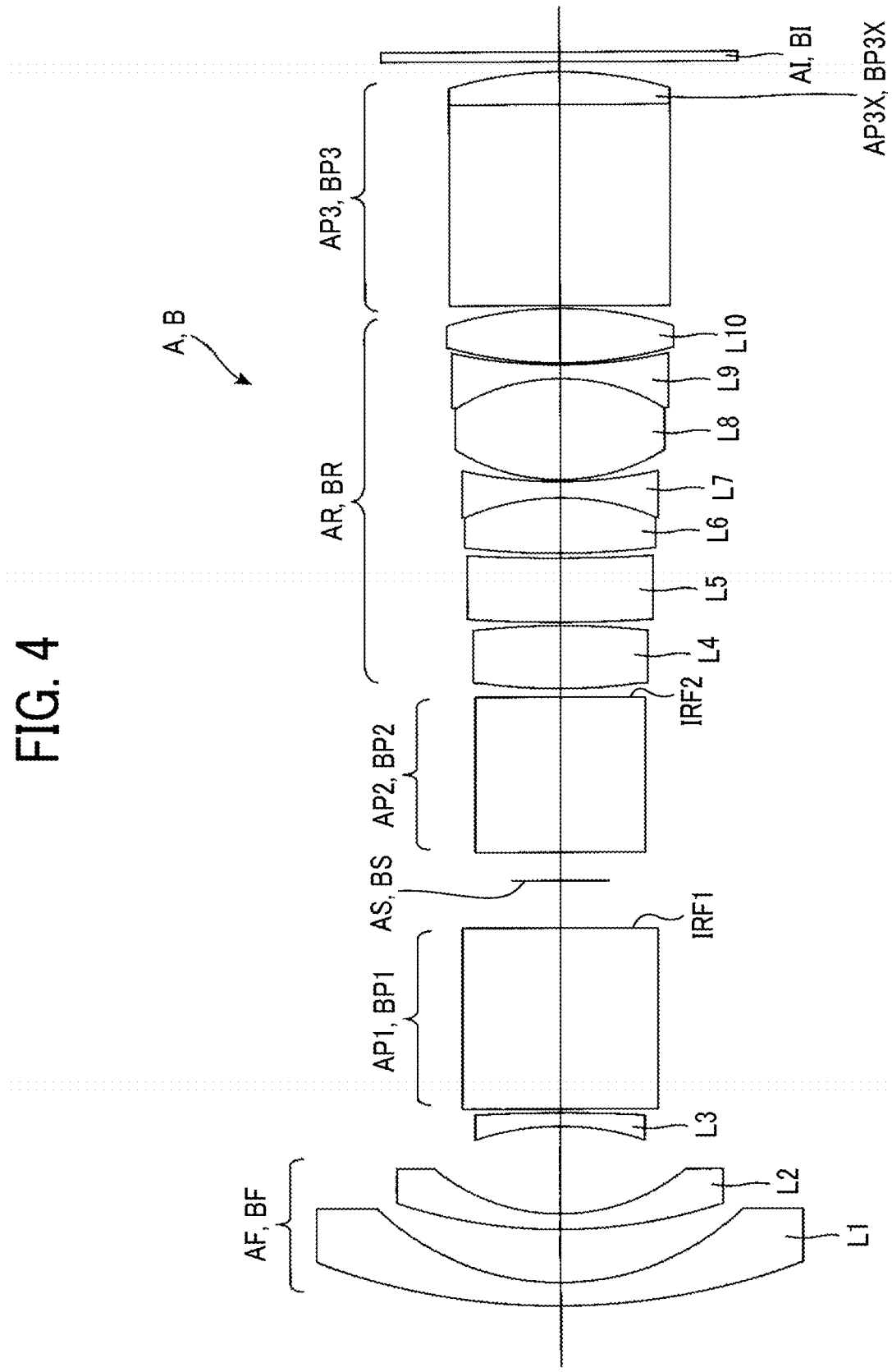
FIG. 4 is a development diagram of a wide-angle lens system and an image sensor.
Figure 5:
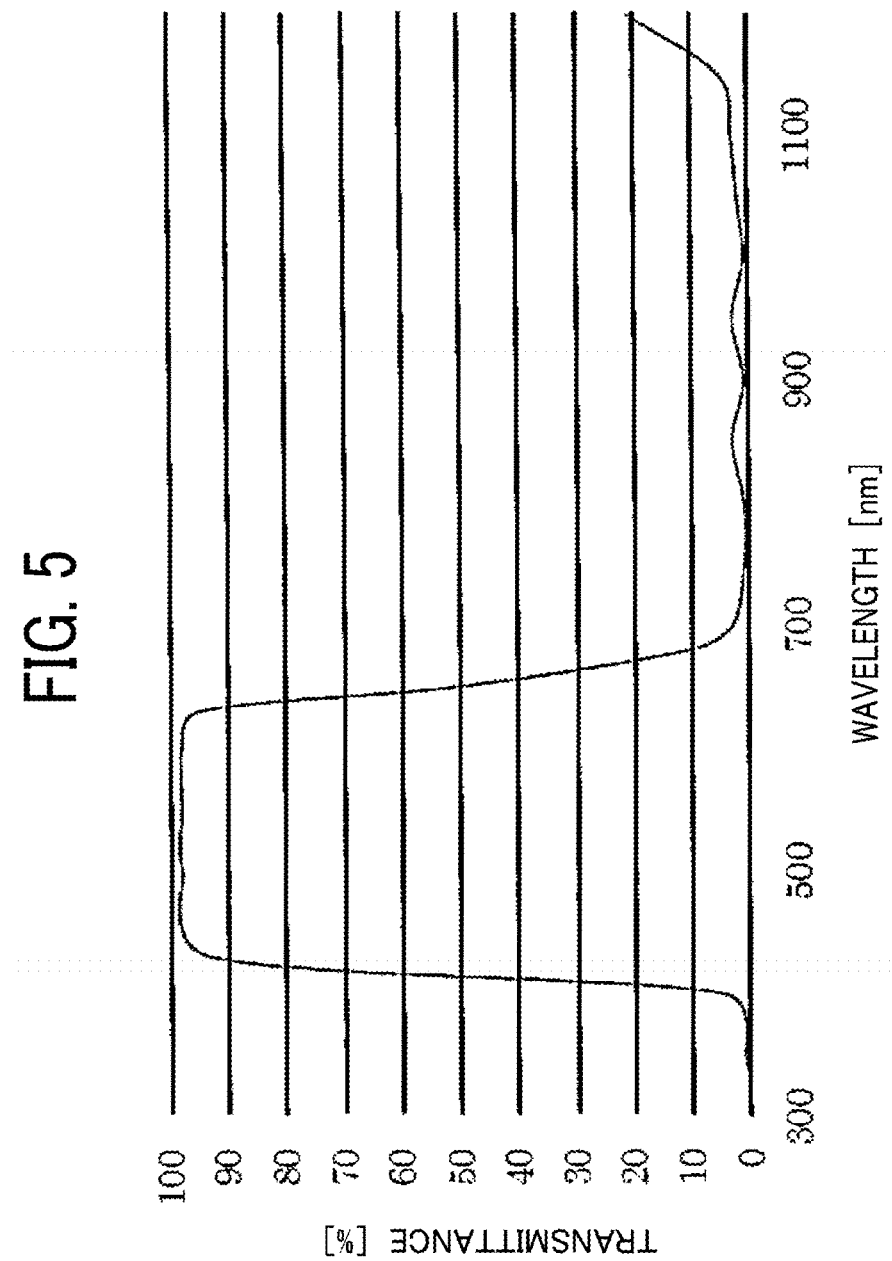
FIG. 5 is a graph presenting an example of the wavelength-transmittance characteristics of an infrared-cut coat or an infrared-cut filter.

The negative front group AF emits object light rays incident from front rearward while diverging the light rays. The first prism AP1 reflects the object light rays incident from the negative front group AF leftward by 90°. A first infrared-cut filter (object-side filter) IRF1 is provided on a surface on the image side (an emission surface that is a flat surface) of the first prism AP1, for example, by vapor deposition. The first infrared-cut filter (object-side filter) HU' will be described later in more detail. The variable aperture stop AS adjusts the transmission amount of the object light rays reflected by the first prism AP1 (performs light amount adjustment) (sets the transmission amount of the object light rays reflected by the first prism AP1). The second prism AP2 reflects the object light rays after the amount of light of the object light rays has been adjusted by the variable aperture stop AS (object light rays after the amount of light by which the stop AS transmits the object light rays has been set) downward by 90°. A second infrared-cut filter (image-side filter) IRF2 is provided on a surface on the image side (an emission surface that is a flat surface) of the second prism AP2, for example, by vapor deposition. The second infrared-cut filter (image-side filter) IRF2 will be described later in more detail. The positive rear group AR emits the object light rays reflected by the second prism AP2 downward while converging the object light rays. The third prism AP3 reflects the object light rays incident from the positive rear group AR rightward by 90° to form an image on an imaging surface of the image sensor AI. An emission surface of the third prism AP3 has a convex surface AP3X that protrudes toward the imaging surface of the image sensor AI. The negative front group AF and the positive rear group AR each include a plurality of lenses as illustrated in FIG. 4 (in FIGS. 1 to 3, AF and AR are indicated as representative reference signs).

The wide-angle lens system B includes, in the order from an object side toward an image side, a negative front group BF, a first prism (first reflector) BP1, a variable aperture stop (stop) BS, a second prism (second reflector) BP2, a positive rear group BR, and a third prism (third reflector) BP3. The negative front group BF has a function of taking in rays with a large angle of view of more than 180°. The positive rear group BR has a function of correcting aberration of a formed image.

The negative front group BF emits object light rays incident from rear forward while diverging the light rays. The first prism BP1 reflects the object light rays incident from the negative front group BF rightward by 90°. A first infrared-cut filter (object-side filter) IRF1 is provided on a surface on the image side (an emission surface that is a flat surface) of the first prism BP1, for example, by vapor deposition. The first infrared-cut filter (object-side filter) IRF1 will be described later in more detail. The variable aperture stop BS adjusts the transmission amount of the object light rays reflected by the first prism BP1 (performs light amount adjustment) (sets the transmission amount of the object light rays reflected by the first prism BP1). The second prism BP2 reflects the object light rays after the amount of light of the object light rays has been adjusted by the variable aperture stop BS (object light rays after the amount of light by which the stop BS transmits the object light rays has been set) downward by 90°. A second infrared-cut filter (image-side filter) IRF2 is provided on a surface on the image side (an emission surface that is a flat surface) of the second prism BP2, for example, by vapor deposition. The second infrared-cut filter (image-side filter) IRF2 will be described later in more detail. The positive rear group BR emits the object light rays reflected by the second prism BP2 downward while converging the object light rays. The third prism BP3 reflects the object light rays incident from the positive rear group BR leftward by 90° to form an image on an imaging surface of the image sensor BI. An emission surface of the third prism BP3 has a convex surface BP3X that protrudes toward the imaging surface of the image sensor BI. The negative front group BF and the positive rear group BR each include a plurality of lenses as illustrated in FIG. 4 (in FIGS. 1 to 3, BF and BR are indicated as representative reference signs).

The image sensors AI and BI of the wide-angle lens systems A and B are supported such that the imaging surface of the image sensor AI faces left, the imaging surface of the image sensor BI faces right, and back surfaces (surfaces opposite to the imaging surfaces) of the image sensors AI and BI are arranged face to face (the surfaces opposite to the imaging surfaces of the image sensors AI and BI are arranged to face each other).

FIG. 4 is a development diagram of each of the wide-angle lens systems A and B and the image sensors AI and BI. FIG. 4 provides illustration while ignoring reflection directions by the first prism AP1 to the third prism AP3, and the first prism BP1 to the third prism BP3. Thus, the wide-angle lens systems A and B have the same (common) configuration and the image sensors AI and BI have the same (common) configuration in FIG. 4.

In the following lens data, f denotes a focal length of the entire system, fNO denotes an F-number, and w denotes an angle of view. The surface numbers are 1 to 28 from the object side toward the image side, and denote lens surfaces, incident surfaces and emission surfaces of prisms, imaging surfaces of image sensors, and so forth. R denotes a curvature radius of each surface (a paraxial curvature radius for an aspherical lens), D denotes a surface distance, Nd denotes a refractive index for the d-line, and vd denotes an Abbe number for the d-line. An object distance is infinity. The unit of an amount having a length dimension is "mm".

| Lens data f = 2.6 (mm), fNO = 2.15, w = 100(°) | | | | |
|---|---|---|---|---|
| Surface No. | R | D | Nd | vd |
| 1 (Negative front group) | 30.68 | 1.20 | 1.85 | 23.78 |
| 2 (Negative front group) | 11.83 | 2.65 | | |
| 3* (Negative front group) | 57.01 | 0.80 | 1.85 | 40.39 |
| 4* (Negative front group) | 7.23 | 4.52 | | |
| 5* (Negative front group) | −20.36 | 0.70 | 1.82 | 42.71 |
| 6* (Negative front group) | 308.51 | 0.20 | | |
| 7 (First prism) | Infinity | 9.30 | 1.82 | 46.62 |
| 8 (First prism) | Infinity | 3.90 | | |
| (First infrared-cut filter (object-side filter)) | | | | |
| 9 (Second prism) | Infinity | 8.00 | 1.82 | 46.62 |
| 10 (Second prism) | Infinity | 0.50 | | |
| (Second infrared-cut filter (image-side filter)) | | | | |
| 11* (Positive rear group) | 25.81 | 3.21 | 2.00 | 19.32 |
| 12* (Positive rear group) | −31.14 | 0.17 | | |
| 13* (Positive rear group) | 66.44 | 3.30 | 1.73 | 54.04 |
| 14* (Positive rear group) | 90.73 | 0.26 | | |
| 15 (Positive rear group) | 34.26 | 2.87 | 1.73 | 54.68 |
| 16 (Positive rear group) | −10.30 | 0.84 | 1.85 | 23.78 |
| 17 (Positive rear group) | 19.44 | 0.10 | | |
| 18 (Positive rear group) | 8.62 | 5.20 | 1.50 | 81.55 |
| 19 (Positive rear group) | −8.62 | 0.70 | 1.85 | 23.78 |
| 20 (Positive rear group) | 21.73 | 0.10 | | |
| 21 (Positive rear group) | 18.00 | 2.80 | 1.70 | 55.46 |
| 22* (Positive rear group) | −12.67 | 0.13 | | |
| 23 (Third prism) | Infinity | 10.40 | 1.88 | 40.77 |
| 24 (Third prism) | Infinity | 1.67 | 1.62 | 63.86 |
| 25* (Convex surface) | −8.52 | 0.52 | | |
| 26 (Cover glass) | Infinity | 0.50 | 1.52 | 64.14 |
| 27 (Cover glass) | Infinity | 1.20 | | |
| 28 (Imaging surface) | Infinity | 0.00 | | 0.00 |

A surface with mark * in the lens data is an aspherical surface.
The aspherical shape is expressed by the following expression.
$$X = CH^2/[1 + \sqrt{\{1 - (1+K)C^2H^2\}}] + A4 \cdot H^4 + A6 \cdot H^6 + A8 \cdot H^8 + A10 \cdot H^{10} + A12 \cdot H^{12} + A14 \cdot H^{14} + A16 \cdot H^{16}$$

In this expression, C denotes the reciprocal of the paraxial curvature radius (paraxial curvature), H denotes a height from the optical axis, K denotes a conic constant, AI etc. is an aspherical coefficient of each order, and X denotes an aspherical amount in the optical-axis direction.

The paraxial curvature radius R, the conic constant K, and the aspherical coefficients A1 to A16 are given to specify the shape.

Aspherical Data
The 3rd surface
4th: 1.13E−05
6th: 6.96E−06
8th: −5.49E−08
10th: −1.82E−10
12th: −2.57E−13
14th: 9.79E−14
16th: −5.42E−16
The 4th surface
4th: −1.07E−03
6th: 4.27E−05
8th: −7.88E−07
10th: −5.07E−09
12th: 7.20E−10
14th: −1.43E−12
16th: −4.65E−13
The 5th surface
4th: −1.24E−03
6th: 2.65E−05
8th: −3.95E−06
10th: 1.41E−07
12th: −1.45E−09
14th: 1.89E−10
16th: −5.43E−12
The 6th surface
4th: −5.49E−04
6th: 1.62E−06
8th: −1.89E−06
10th: 1.05E−07
The 11th surface
4th: 1.02E−04
6th: −1.34E−06
8th: 1.08E−07
10th: −1.61E−08
12th: −2.61E−10
14th: 3.19E−11
The 12th surface
4th: 2.05E−04
6th: −1.82E−05
8th: 4.81E−07
10th: 6.15E−08
12th: −4.91E−09
14th: 9.99E−11
The 13th surface
4th: 1.18E−04
6th: −2.45E−05
8th: 1.17E−06
10th: 2.06E−08
12th: −4.26E−10
14th: −6.40E−11
16th: 1.01E−12
The 14th surface
4th: 2.94E−08
6th: 7.20E−07
8th: −8.02E−08
10th: 1.83E−08
12th: 2.72E−10
14th: −6.13E−12

16th: −1.10E−12
The 22nd surface
4th: 3.00E−04
6th: 1.19E−05
8th: −8.80E−07
10th: 3.68E−08
12th: −9.95E−10
14th: 1.19E−11
The 25th surface
4th: 4.82E−03
6th: −4.70E−04
8th: 3.03E−05
10th: −1.13E−06
12th: 2.27E−08
14th: −1.87E−10

In the aspherical data, "E−a" represents "$\times 10^{-a}$". In addition, "4th to 16th" represent "A4 to A16".

The negative front groups AF and BF each include, in the order from the object side, a negative meniscus lens L1 having a convex surface facing the object side, a negative meniscus lens L2 having a convex surface facing the object side, and a biconcave negative lens L3. Both surfaces of the negative meniscus lens L2 are aspherical. Both surfaces of the biconcave negative lens L3 are aspherical.

The positive rear groups AR and BR each include, in the order from the object side, a biconvex positive lens L4, a positive meniscus lens L5 having a convex surface facing the object side, a biconvex positive lens L6, a biconcave negative lens L7, a biconvex positive lens L8, a biconcave negative lens L9, and a biconvex positive lens L10. Both surfaces of the biconvex positive lens L4 are aspherical. Both surfaces of the positive meniscus lens L5 are aspherical. The biconvex positive lens L10 has an aspherical surface on the image side. The biconvex positive lens L6 and the biconcave negative lens L7 are cemented to each other. The biconvex positive lens L8 and the biconcave negative lens L9 are cemented to each other.

The above-described configurations of the negative front groups AF and BF and the positive rear groups AR and BR are merely examples, and the configurations of the negative front groups AF and BF and the design of the positive rear groups AR and BR can be changed in design in various ways. The front groups AF and BF each may have positive power instead of negative power, and the rear groups AR and BR each may have negative power instead of positive power.

With the imaging system 1 configured as described above, the negative front group AF of the wide-angle lens system A and the negative front group BF of the wide-angle lens system B face in opposite directions in the front-rear direction and are arranged on the same (common) optical axis. The positive rear group AR that is bent by the first prism AP1 and the second prism AP2 by 90° each and that extends in the up-down direction and the positive rear group BR that is bent by the first prism BP1 and the second prism BP2 by 90° each and that extends in the up-down direction are arranged to be separated from each other and parallel to each other in the left-right direction. The image sensor AI located at a position bent rightward by the third prism AP3 by 90° and the image sensor BI located at a position bent leftward by the third prism BP3 by 90° are arranged such that the imaging surfaces of the image sensors AI and BI face in the left-right direction and the surfaces on the sides opposite to the imaging surfaces are arranged face to face. When the imaging system 1 is mounted on the casing 10, the lens on the object side of the negative front group AF of the wide-angle lens system A protrudes to front of (is exposed from) the casing 10, the lens on the object side of the negative front group BF of the wide-angle lens system B protrudes to rear of (is exposed from) the casing 10, and the other components are housed in the casing 10.

That is, the wide-angle lens systems A and B include the front groups AF and BF that are opposite to each other in the front-rear direction in an upper portion of the casing 10, and the rear groups AR and BR that extend in parallel to each other from the upper portion to a lower portion of the casing 10. The wide-angle lens systems A and B each include, as prisms (reflectors), the first prism (the first reflector) AP1, BP1 that changes the optical path of the object light rays which have passed through the front group AF, BF in the upper portion of the casing 10 to the left-right direction; the second prism (the second reflector) AP2, BP2 that changes the optical path of the object light rays which have passed through the first prism (the first reflector) AP1, BP1 in the upper portion of the casing 10 to the up-down direction; and the third prism (the third reflector) AP3, BP3 that changes the optical path of the object light rays which have passed through the rear group AR, BR in the lower section of the casing 10 to the left-right direction. Thus, the imaging optical system and the imaging system 1 can be arranged in the casing 10 with high layout efficiency, and can be compact.

A "plane between opposed lenses" and a "space between opposed lenses" (for example, lenses closest to the object side) are defined now. The "plane between opposed lenses" and the "space between opposed lenses" are determined by at least one of a subset of the two wide-angle lens systems A and B and a subset of the two image sensors AI and BI.

For example, the plane between opposed lenses is a (virtual) plane orthogonal to the shared optical axis between the negative front group AF of the wide-angle lens system A and the negative front group BF of the wide-angle lens system B and/or a (virtual) plane that includes both of the optical axis of the positive rear group AR of the wide-angle lens system A and the optical axis of the positive rear group BR of the wide-angle lens system B. In the embodiments of the present disclosure, the virtual plane that includes each of the right-to-left direction and the up-to-down direction corresponds to the plane between the opposed lenses. For example, the drawing sheet of FIG. 2 corresponds to the plane between the opposed lenses.

The "space between the opposed lenses" can be specified as, for example, a space that is defined between an optical-axis orthogonal plane including a surface on the most object side of the negative front group AF of the wide-angle lens system A and an optical-axis orthogonal plane including a surface on the most object side of the negative front group BF of the wide-angle lens system B. Alternatively, the space between the opposed lenses is defined as a space formed between the plane (including the surface closest to the object side) orthogonal to the optical axis of the negative front group AF of the wide-angle lens system A and the plane (including the surface closest to the object side) orthogonal to the optical axis of the negative front group BF of the wide-angle lens system B. The space between the opposed lenses is illustrated in FIG. 1.

At this time, the first prism AP1 to the third prism AP3 of the wide-angle lens system A and the first prism BP1 to the third prism BP3 of the wide-angle lens system B change the optical paths to the image sensors AI and BI three times (at least two times) within at least one of the above-described "plane between the opposed lenses" and "space between the opposed lenses". To be more specific, the first prism AP1 and the second prism AP2 of the wide-angle lens system A reflect the object light rays (change the optical path) two times between the negative front group AF and the positive rear group AR, and the first prism BP1 and the second prism BP2 of the wide-angle lens system B reflect the object light rays (change the optical path) two times between the negative front group BF and the positive rear group BR. The third prism AP3 of the wide-angle lens system A reflects the object light rays (changes the optical path) one time between the positive rear group AR and the image sensor AI, and the third prism BP3 of the wide-angle lens system B reflects the object light rays (changes the optical path) one time between the positive rear group BR and the image sensor BI.

As described above, the optical paths of the wide-angle lens systems A and B are bent a plurality of times in different directions within at least one of the "plane between the opposed lenses" and the "space between the opposed lenses" defined by at least one of the subset of the two wide-angle lens systems A and B and the subset of the two image sensors AI and BI. Thus, the optical-path lengths of the wide-angle lens systems A and B can be long. In addition, the distance between incident positions of maximum view-angle rays (a distance between maximum angle-of-view points) on the lens on the most object side of the wide-angle lens system A (the lens on the foremost side of the negative front group AF) and the lens on the most object side of the wide-angle lens system B (the lens on the rearmost side of the negative front group BF) (FIG. 1 illustrates the distance between maximum angle-of-view points). Consequently, an increase in size of the image sensors AI and BI and a decrease in size (a decrease in thickness) of the imaging system 1 both can be attained, the parallax which is an overlapping amount of two images joined by calibration can be decreased, and hence an image with high quality can be provided.

The lenses L1 on the most object sides of the two wide-angle lens systems A and B are arranged to face different directions. To be more specific, light from front to rear is incident on the lens L1 provided on the most object side of the wide-angle lens system A, and light from rear to front is incident on the lens L1 provided on the most object side of the wide-angle lens system B.

The first prism AP1 to the third prism AP3 and the first prism BP1 to the third prism BP3 (the reflectors) of the two wide-angle lens systems A and B change the optical paths to the image sensors AI and BI within a space between planes orthogonal to the optical axis including the surfaces of the lenses L1 arranged on the most object sides of the two wide-angle lens systems A and B.

The two first prisms AP1 and BP1 of the two wide-angle lens systems A and B change the optical paths to different directions. To be more specific, the first prism AP1 of the wide-angle lens system A changes the optical path of the light incident in a direction from front to rear (reflection optical path) to a direction from right to left, and the first prism BP1 of the wide-angle lens system B changes the optical path of the light incident in a direction from rear to front (reflection optical path) to a direction from left to right.

The two second prisms AP2 and BP2 of the two wide-angle lens systems A and B change the optical paths to the same direction. To be more specific, the second prism AP2 of the wide-angle lens system A changes the optical path of the light incident in a direction from right to left (reflection optical path) to a direction from above to below, and the second prism BP2 of the wide-angle lens system B changes the optical path of the light incident in a direction from left to right (reflection optical path) to a direction from above to below.

The first prism AP1 of the wide-angle lens system A and the first prism BP1 of the wide-angle lens system B have a reflection surface (reflector) common to the wide-angle lens systems A and B. That is, the first prism AP1 and the first prism BP1 have inclined surfaces adjacent to each other and hence share a reflection surface. The reflection surface of the wide-angle lens systems A and B include a reflection film common to the wide-angle lens systems A and B. The reflection film is sandwiched between the inclined surfaces of the first prism AP1 and the first prism BP1 that are two optically equivalent transparent members. In this state, the first prism AP1, the first prism BP1, and the reflection film are integrated with one another, and the reflection surface (reflector) common to the wide-angle lens systems A and B is formed. Thus, the widths of the wide-angle lens systems A and B in the axial direction of incident light can be decreased.

Alternatively, the first prism AP1 of the wide-angle lens system A and the first prism BP1 of the wide-angle lens system B are two optically equivalent transparent members and each have a reflection surface (reflector). The first prism AP1 and the first prism BP1 are arranged such that their reflection surfaces face each other. In this case, when the reflection surfaces face each other, the reflection surfaces do not have to be parallel to each other. The reflection surfaces may face each other in a manner that, when the reflection surfaces are viewed in a direction perpendicular to one of the reflection surfaces, the one reflection surface partly overlaps the other reflection surface. At this time, a reflection film may be present between the reflection surfaces. The reflection film may be formed on each of the reflection surfaces, or a reflection film common to the reflection surfaces may be provided. While the reflection surfaces are arranged to face each other in a separate state, the reflection surfaces may be arranged to face each other in a contact state or a bonded state with an adhesive. When a reflection film is formed on each of the reflection surfaces, the reflection surfaces may be provided to face each other in a contact state or a bonded state with an adhesive, or the reflection surfaces may be arranged to face each other in a separate state. The state in which the reflection surfaces or the reflection films are separated from each other indicates a state in which the reflection surfaces or the reflection films are arranged to face each other without a contact. As described above, since the reflection surfaces or the reflection films of the first prism AP1 of the wide-angle lens system A and the first prism BP1 of the wide-angle lens system B are arranged to face each other, the widths of the wide-angle lens systems A and B in the axial direction of incident light can be decreased.

The variable aperture stop AS is arranged between the first prism AP1 and the second prism AP2 of the wide-angle lens system A. The variable aperture stop BS is arranged between the first prism BP1 and the second prism BP2 of the wide-angle lens system B. The first prism AP1 and the second prism AP2 are arranged near (front and rear of) the variable aperture stop AS for light-amount adjustment, and the first prism BP1 and the second prism BP2 are arranged near (front and rear of) the variable aperture stop BS for light-amount adjustment. Thus, a small right-angle prism can be used, and the distance between the wide-angle lens systems A and B can be decreased. A symmetrical configuration in which the first prism AP1 and the second prism AP2 are arranged on both sides of the variable aperture stop AS, and the negative front group AF and the positive rear group AR are arranged on both sides of the first prism AP1 and the second prism AP2 can be attained. In addition, a symmetrical configuration in which the first prism BP1 and the second prism BP2 are arranged on both sides of the variable aperture stop BS, and the negative front group BF and the positive rear group BR are arranged on both sides of the first prism BP1 and the second prism BP2 can be attained.

For each of the variable aperture stops AS and BS, a variable aperture stop can be used, in which the amount of light transmitted through the variable aperture stop AS, BS can be set because the aperture of the stop is variable. Alternatively, a fixed aperture stop may be used, in which the amount of light transmitted through the aperture stop is previously set instead of the variable aperture stops AS, BS. In this case, setting the amount of light represents determining the amount of light to be transmitted in accordance with the size of the aperture of the stop. When the amount of light to be transmitted is set using the fixed aperture stop, the fixed aperture stop in which the size of the aperture of the stop is previously set and the fixed aperture stop with the fixed aperture size is used, and hence the amount of light to be transmitted is constant. When the amount of light to be transmitted is set using the variable aperture stop, the setting includes manual light-amount setting of setting the amount of light to be transmitted per image capturing by making the size of the aperture be variable through manual operation of a user, and automatic light-amount setting of setting the amount of light to be transmitted per image capturing by making the aperture be variable based on the output of the image sensor. While the example has been described in which the position of the stop AS is between the first prism AP1 and the second prism AP2 and the position of the stop BS is between the first prism BP1 and the second prism BP2 according to this embodiment, the positions of the stops AS and BS may be in front of the first prisms AP1 and BP1, may be in rear of the second prisms AP2 and BP2, or may be in front or rear of the third prisms AP3 and BP3. The stops AS and BS each do not have to be located directly in front or directly in rear of the corresponding prism, and may be arranged near the prism. As far as the above-described advantageous effect is attained, the stops AS and BS each may be arranged between lenses of the corresponding rear group (for example, between the lens L4 and the lens L5 of the rear group). While the case has been described where each of the wide-angle lens systems A and B includes a single stop in this embodiment, a single wide-angle lens system may include a plurality of stops. For example, a first stop may be provided between the first prism AP1 and the second prism AP2 and between the first prism BP1 and the second prism BP2, and a second stop may be provided in rear of the third prism AP3 and rear of the third prism BP3.

The opening degrees of the variable aperture stop AS and the variable aperture stop BS are individually adjusted based on the outputs of the image sensor AI and the image sensor BI. In this case, automatic light-amount setting using the variable aperture stops AS and BS is described as an example of light-amount setting using a stop according to the embodiment of the disclosure. The sizes of the apertures of the variable aperture stop AS and the variable aperture stop BS are set based on the outputs of the image sensor AI and the image sensor BI. For example, when the imaging apparatus on which the imaging system 1 is mounted is used outside, there may be a case where sunlight is incident more on one of the wide-angle lens systems A and B and consequently the brightness (exposure state) obtained by the wide-angle lens system A may markedly differ from the brightness obtained by the wide-angle lens system B. In this state, when the images of the image sensor AI and the image sensor BI are composited, an unnatural spherical image including the boundary between a bright portion and a dark portion may be obtained. When sunlight is incident more on one of the wide-angle lens systems A and B, the variable aperture stop of the one wide-angle lens system is narrowed (decreased) as compared with the variable aperture stop of the other wide-angle lens system, hence the brightnesses (exposure states) of the wide-angle lens systems A and B are adjusted (set) to be uniform, and a natural spherical image not including the boundary between a bright portion and a dark portion can be obtained.

The third prism AP3 of the wide-angle lens system A has the convex surface (aspherical surface) AP3X protruding toward the image sensor AI. The third prism BP3 of the wide-angle lens system B has the convex surface (aspherical surface) BP3X protruding toward the image sensor BI. Since the wide-angle lens systems A and B have short focal lengths, when the final planes of the wide-angle lens systems A and B are bent like this embodiment, a situation in which the back focus is long although the focal length is short may occur. To avoid this situation, the convex surface AP3X and the convex surface BP3X are provided to change the emission positions. For the convex surface AP3X and the convex surface BP3X, the emission surfaces of the prisms AP3 and BP3 may be processed to obtain convex surfaces, or convex lenses processed separately from the emission surfaces of the prisms AP3 and BP3 may be bonded to the emission surfaces of the prisms AP3 and BP3 and integrated. Alternatively, separate convex lenses may be arranged downstream of the prisms AP3 and BP3.

For example, with a reflective infrared-cut coat or a reflective infrared-cut filter, it is difficult to suppress reflectance for wavelengths on the long-wavelength side, particularly around 1000 nm. Even when the total number of films of the reflective infrared-cut coat or the infrared-cut filter is increased, the transmittance inevitably becomes several percent (see FIG. 5). When infrared transmitted by such several-percent transmittance is received by an image sensor, the infrared affects white balance (WB), and the resultant image has a defective hue. The effect of the defective hue varies depending on the amount of infrared included in the incident light. It is very difficult to avoid the defective hue through adjustment of the image sensor.

Figure 21A:
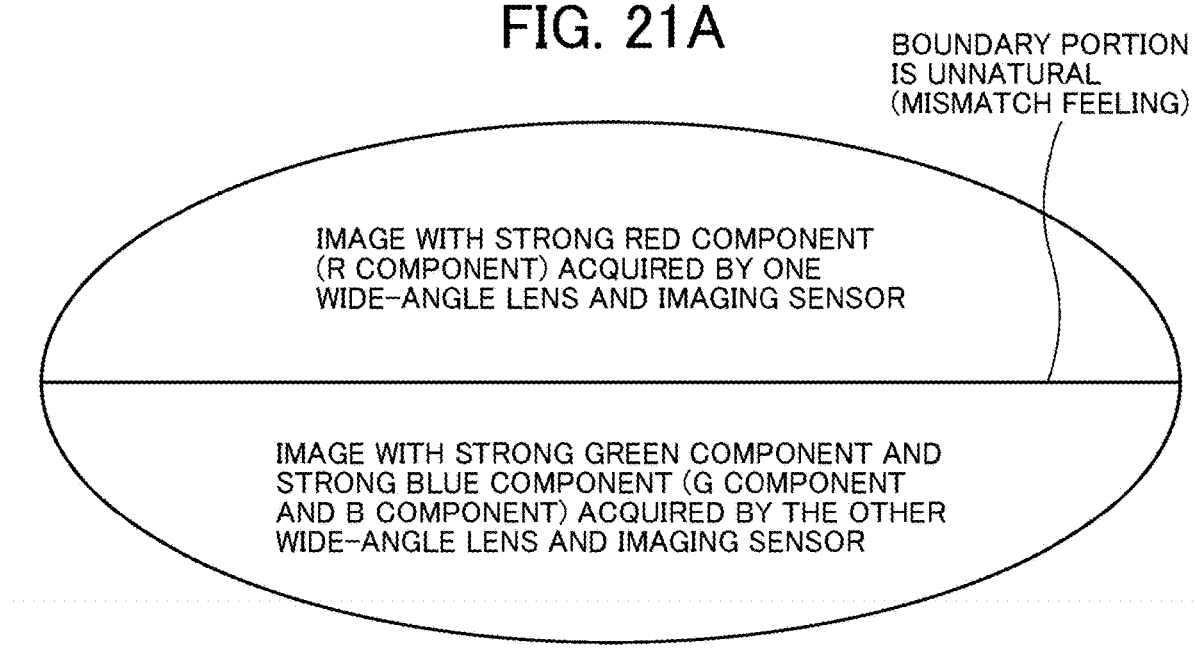
FIGS. 21A and 21B are conceptual diagrams illustrating technical problems on a spherical image of a spherical imaging system according to related art.
Figure 21B:
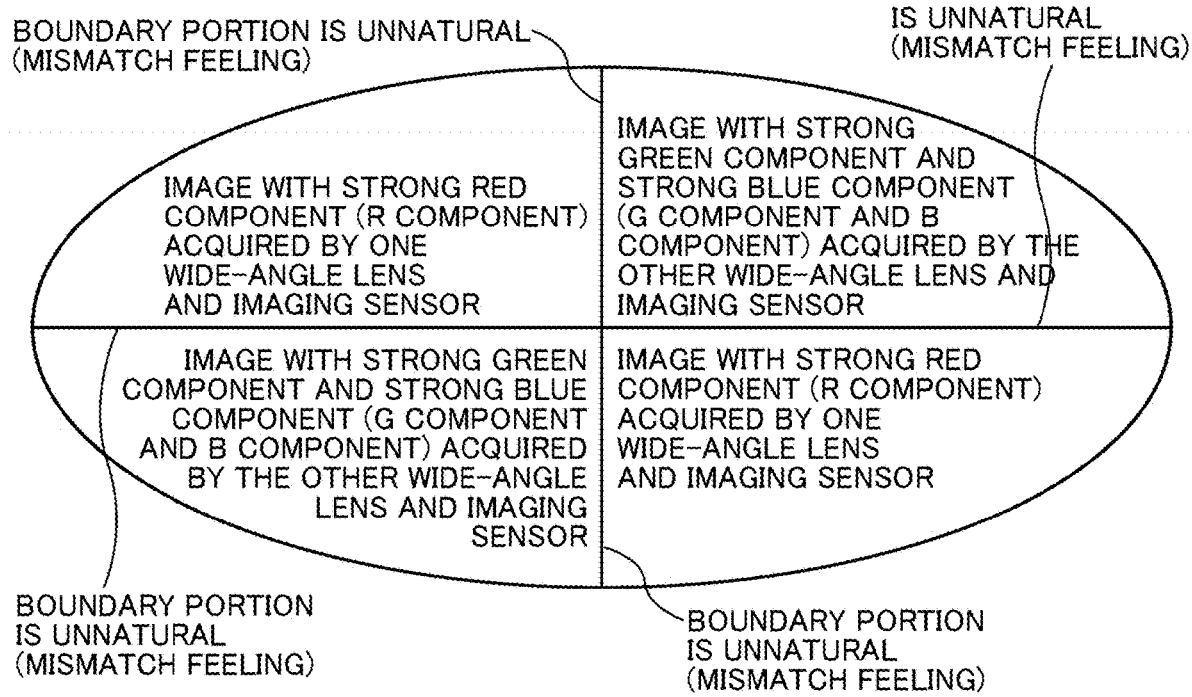

For example, a case of capturing a spherical image including both the outside and inside of a room on a fine weather day is expected. In this case, sunlight is incident more on the wide-angle lens facing the outside and an image with a strong red component (R component) (reddish image) is acquired, and light of, for example, a light-emitting diode (LED) is incident more on the wide-angle lens facing the inside and an image with a strong green component and a strong blue component (G component and B component) (non-reddish image) is acquired. A joint portion (boundary portion) of the two images may give a mismatch feeling (see FIGS. 21A and 21B).

In this embodiment, the above-described problems are considered as significant technical problems. The first infrared-cut filter (object-side filter) IRF1 and the second infrared-cut filter (image-side filter) IRF2 are provided in each of the two wide-angle lens systems A and B, and the first infrared-cut filter IRF1 and the second infrared-cut filter IRF2 have spectral characteristics different from each other.

The spectral characteristics of the first infrared-cut filter IRF1 and the second infrared-cut filter IRF2 are set such that a wavelength of light for which the first infrared-cut filter IRF1 has a spectral transmittance and a spectral reflectance of 50% is longer than a wavelength of light for which the second infrared-cut filter IRF2 has a spectral transmittance and a spectral reflectance of 50%. That is, the first infrared-cut filter IRF1 has a characteristic of relatively more easily cutting light on a long-wavelength side (as compared with the second infrared-cut filter IRF2). The second infrared-cut filter IRF2 has a characteristic of relatively more easily cutting light on a short-wavelength side (as compared with the first infrared-cut filter IR1).

More specifically, the first infrared-cut filter IRF1 and the second infrared-cut filter IRF2 have a spectral reflectance of 50% or more and a spectral transmittance of 50% or less for light with wavelengths of 650 nm or longer. The first infrared-cut filter IRF1 has a spectral reflectance of 50% or more for light with wavelengths of 750 nm or more, and the second infrared-cut filter IRF2 has a spectral reflectance of 50% or more for light with wavelengths of 650 nm or longer.

Giving attention to each of the two wide-angle lens systems A and B, transmittance for light on the long-wavelength side (for example, infrared) can be suppressed as far as possible by a synergistic effect of the first infrared-cut filter IRF1 and the second infrared-cut filter IRF2. For example, when two-surface infrared-cut filters are provided simply in a wide-angle lens system and the two-surface infrared-cut filters each have a transmittance of 10% for light with a wavelength of 1000 nm, transmitted light to an imaging surface of an image sensor is 1%.

In this embodiment, by shifting the reflecting characteristic of the second infrared-cut filter IRF2 to the short-wavelength side as compared with the reflecting characteristic of the first infrared-cut filter IRF1, the influence of reflected light can be decreased to the minimum. For example, when light on the short-wavelength side (650 nm) is incident on the two wide-angle lens systems A and B and part of the light is tracked, the light is transmitted through the first infrared-cut filter IRF1, then is reflected by the second infrared-cut filter IRF2, and reaches the first infrared-cut filter RF1. In this case, if the first infrared-cut filter IRF1 has a characteristic of reflecting light with wavelengths of 750 nm or longer, the light on the short-wavelength side reflected by the second infrared-cut filter IRF2 is transmitted through the first infrared-cut filter IRF1, and hence the influence of reflection can be prevented. If the first infrared-cut filter IRF1 and the second infrared-cut filter IRF2 have the same reflecting characteristic, the light on the short-wavelength side reflected by the second infrared-cut filter IRF2 is reflected again by the first infrared-cut filter IRF1 and is incident on the image sensor. Light with wavelengths around 650 nm is light for which an image sensor has extremely high sensitivity, and hence the wavelengths are in a range that likely affects an image. Thus, it is extremely effective to prevent the influence of reflection of the light with wavelengths around 650 nm using the first infrared-cut filter IRF1 and the second infrared-cut filter IRF2.

Figure 6:
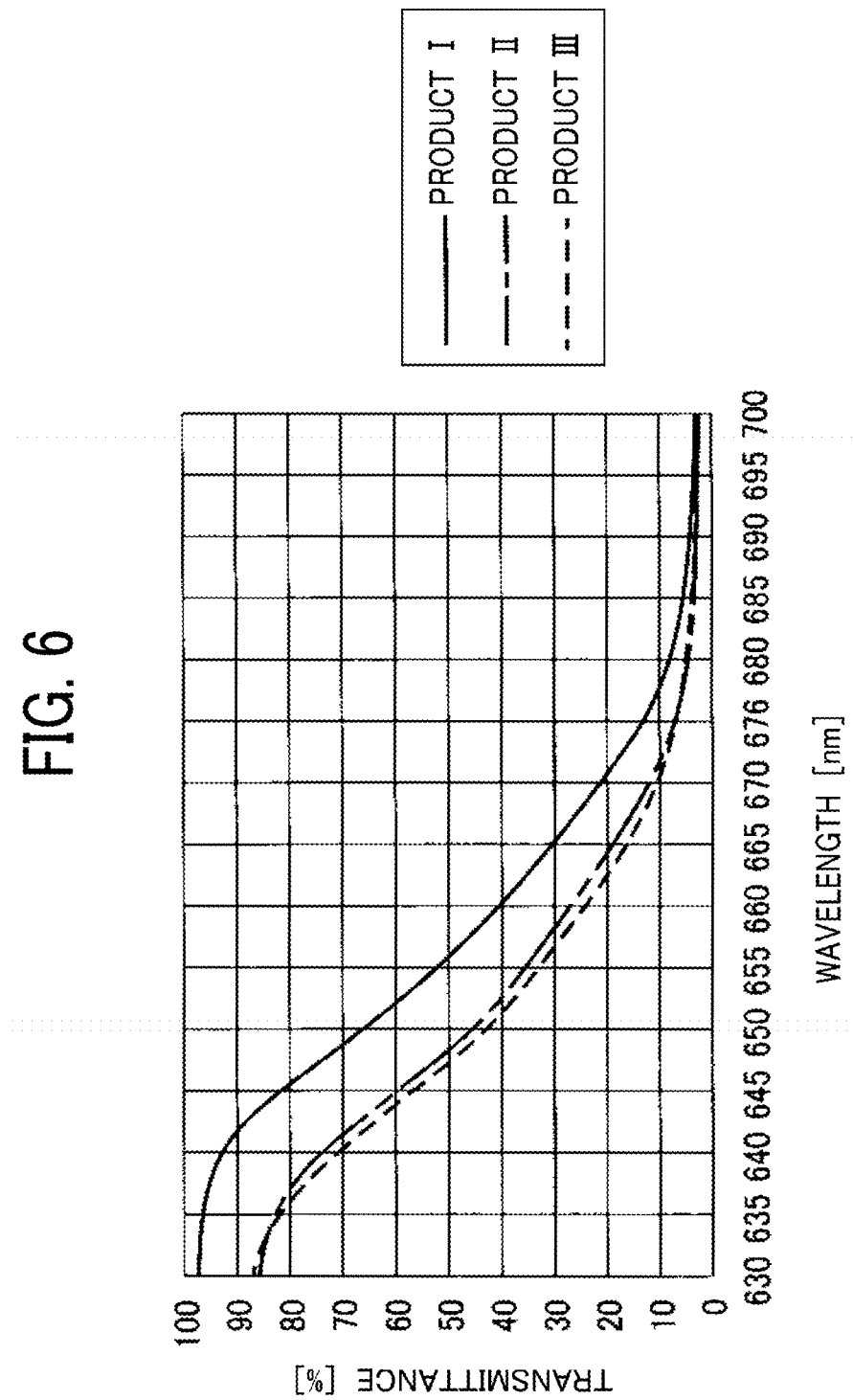
FIG. 6 is a graph presenting an example of variations in the wavelength-transmittance characteristics of infrared-cut coats or infrared-cut filters.

Moreover, as illustrated in FIG. 6, the wavelength-transmittance characteristics of an infrared-cut coat or an infrared-cut filter inevitably vary (product I to product III). Regarding the infrared-cut coat, the wavelength characteristics may be shifted by a certain degree depending on the form of coating. When one infrared-cut coat or one infrared-cut filter is provided in each of the two wide-angle lens systems A and B, the shift of the wavelength characteristics directly affects image quality. However, by providing the first infrared-cut filter IRF1 and the second infrared-cut filter IRF2 in each of the two wide-angle lens systems A and B, the influence for the shift of the wavelength characteristics can be decreased (relaxed).

When the first infrared-cut filter IRF1 and the second infrared-cut filter IRF2 have the same wavelength characteristics in the wide-angle lens systems A and B, light (in particular, light on the long-wavelength side) may be reflected by the first infrared-cut filter IRF1 and the second infrared-cut filter IRF2 and a ghost may be more likely generated. In contrast, by providing the first infrared-cut filter IRF1 that cuts light on the long-wavelength side (for example, 750 nm) on the object side in the optical system, and by providing the second infrared-cut filter IRF2 that cuts light on the short-wavelength side (for example, 650 nm) on the image side in the optical system like this embodiment, infrared is reflected by the second infrared-cut filter IRF2 and is transmitted through the first infrared-cut filter IRF1, and generation of a ghost can be effectively prevented.

Figure 7:
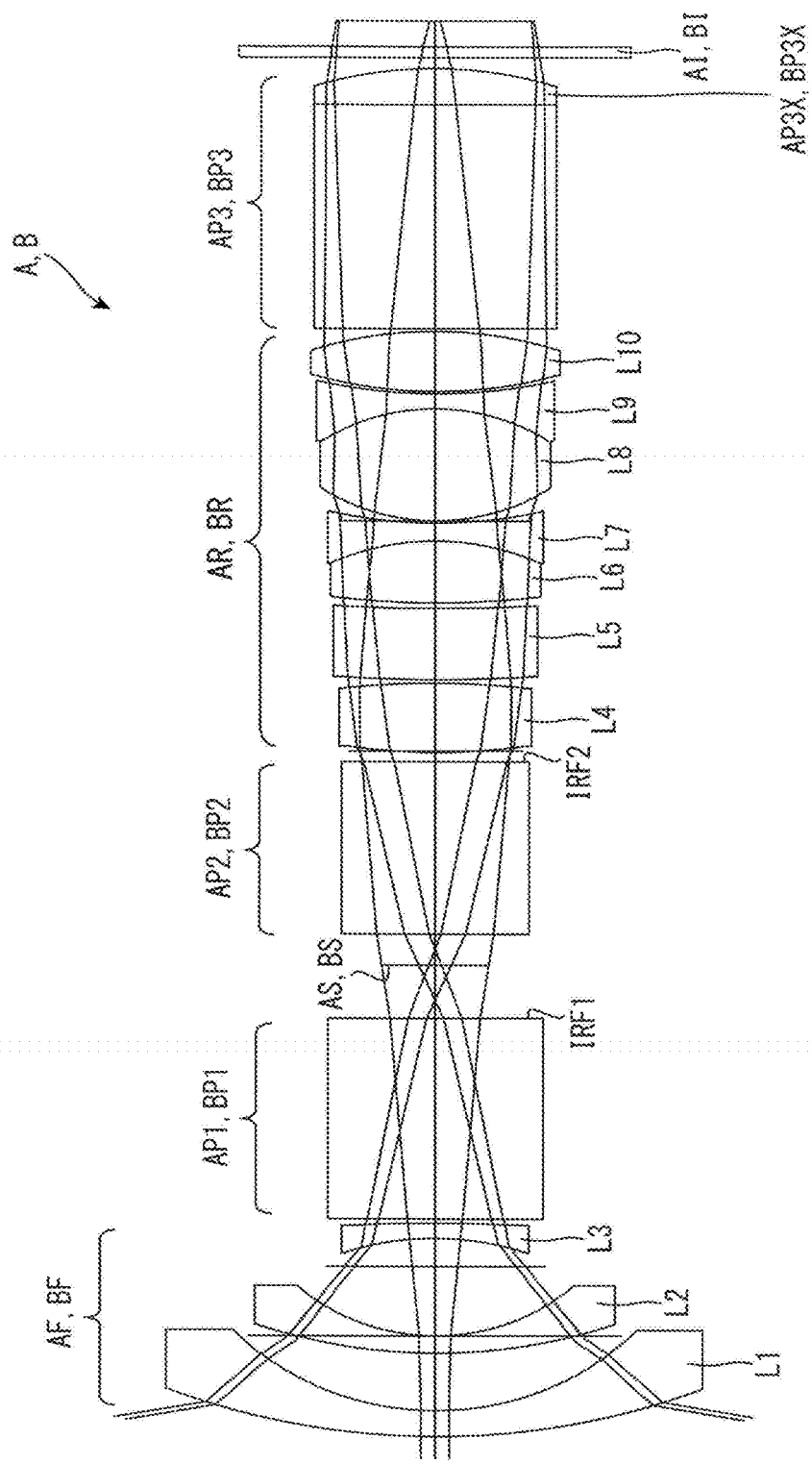
FIG. 7 illustrates an example of trajectories of rays in the lens development diagram of FIG. 4.
Figure 8A:
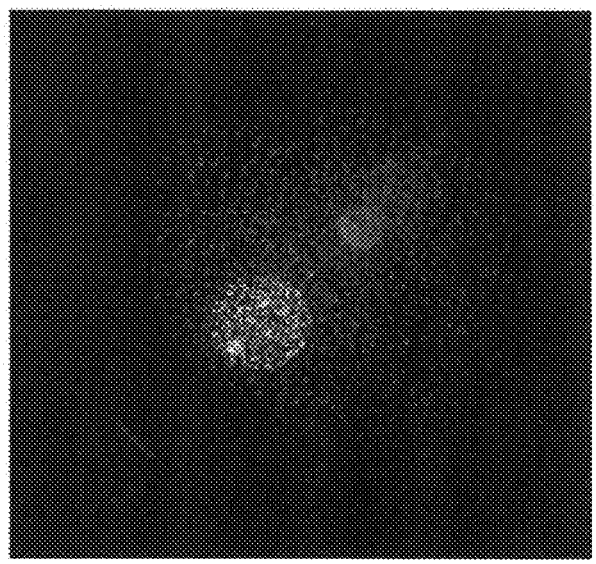
FIGS. 8A and 8B illustrate examples of ghost simulation results.
Figure 8B:

FIG. 7 illustrates an example of trajectories of rays in the lens development diagram of FIG. 4. FIGS. 8A and 8B illustrate examples of ghost simulation results. FIG. 8A illustrates a case where two infrared-cut filters have the same wavelength characteristics. FIG. 8B illustrates a case where two infrared-cut filters have different wavelength characteristics. As illustrated in the drawings (in particular, FIG. 8A and FIG. 8B), the case where the two infrared-cut filters have the different wavelength characteristics can effectively prevent generation of a ghost as compared with the case where the two infrared-cut filters have the same wavelength characteristics.

In this embodiment, the first infrared-cut filter IRF1 is provided on the surface on the image side (the emission surface that is the flat surface) of each of the first prisms AP1 and BP1, and the second infrared-cut filter IRF2 is provided on the surface on the image side (the emission surface that is the flat surface) of each of the second prisms AP2 and BP2. When an infrared-cut filter is provided on a surface with a curvature, a distribution of wavelength characteristics appears. For example, an unnatural image with a strong red component (R component) may be obtained. Additionally or alternatively, an unnatural image in which the hue changes between a center portion near the optical axis and a peripheral portion far from the optical axis may be obtained. By providing the first infrared-cut filter IRF1 and the second infrared-cut filter IRF2 on the flat surfaces, a natural image in which a strong red component (R component) does not appear and the hue does not change between a center portion and a peripheral portion can be obtained. Even when the first infrared-cut filter IRF1 is provided on a surface on the object side (an incident surface that is a flat surface) of each of the first prisms AP1 and BP1, and the second infrared-cut filter IRF2 is provided on a surface on the object side (an incident surface that is a flat surface) of each of the second prisms AP2 and BP2, the advantageous effect like the one described above can be attained. One or both of the first infrared-cut filter IRF1 and the second infrared-cut filter IRF2 can be provided at a portion other than the flat surface (for example, a lens surface having a curvature).

In the wide-angle lens systems A and B, the variable aperture stop AS is provided between the first prism AP1 and the second prism AP2 and the variable aperture stop BS is provided between the first prism BP1 and the second prism BP2. The first prisms AP1 and BP1 and the second prisms AP2 and BP2 located on both sides of the variable aperture stops AS and BS are portions in which object light rays are the thickest, and the incident angle is the closest to zero (afocal property and telecentric property are assured). Since the first infrared-cut filter IRF1 and the second infrared-cut filter IRF2 are provided at the first prisms AP1 and BP1 and the second prisms AP2 and BP2, a high-quality image in which a ghost is not generated and the hue is natural can be obtained.

In general, when one or both of an infrared-absorbing member and an infrared-reflecting member is arranged in an optical system, the member is typically arranged directly in front of an image sensor at which the angle of rays is likely constant. However, the position located directly in front of the image sensor is likely affected by external light, for example, in a manner of a ghost or a flare. In particular, in a spherical camera using a wide-angle lens system (fish-eye lens system), it is difficult to prevent incidence of strong light under various imaging conditions, and the spherical camera is more likely affected by external light, for example, in a manner of a ghost or a flare.

A typical camera requires to cut infrared as described above. This is because a light source including the sun contains light with wavelengths invisible for a human and an imaging element used for a camera captures the wavelengths. Thus, when the infrared is not cut, the infrared may adversely affect auto-exposure (AE) image capturing and auto-white balance (AWB) image capturing. Regarding the optical characteristics of the camera, a harmful image, such as a ghost or a flare, may be captured.

A typical measure for cutting infrared may be, for example, a reflective filter, a reflective coating, an absorbent glass, an absorbent resin, or the like. FIG. 9 illustrates an example of transmittances of an infrared-absorbing filter. In FIG. 9, the horizontal axis plots the wavelength (nm), and the vertical axis plots the transmittance (%). As illustrated in FIG. 9, the infrared-absorbing filter is set to transmit light with wavelengths up to around 650 nm required as visible light, but not to transmit harmful infrared with wavelengths up to around 1200 nm for which an imaging element substantially has no sensitivity.

The optimal location for installing an infrared-absorbing glass is a location at which the incident angle of rays on the filter is small (or no angle) like a coating. In addition, light rays at each incident angle are desirably thick, and a margin for bonding the infrared-absorbing glass is desirably large.

In general, for example, an infrared-absorbing filter can be attached in front (directly in front) of the imaging element. This is because, to attach a thin glass plate, the thin glass plate is desirably arranged along a flat-surface member. However, since light rays are converged in an area near the imaging element, a damage (scratch or the like) or adhesion of dust (contamination) of the infrared-absorbing filter may adversely affect an image. For example, in the case of a wide-angle system, the diameter of light rays with each angle of view is the largest at a stop. In contrast, the diameter of light rays decreases as the light rays are farther from the stop.

Figure 10A:
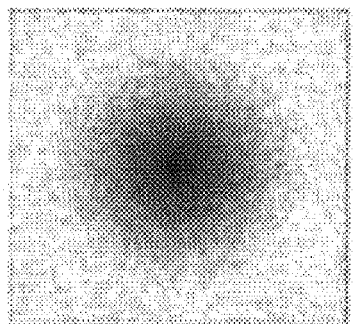
FIGS. 10A to 10C illustrate examples of simulation results indicating how dust adhering to portions of an imaging optical system are captured in images.
Figure 10B:
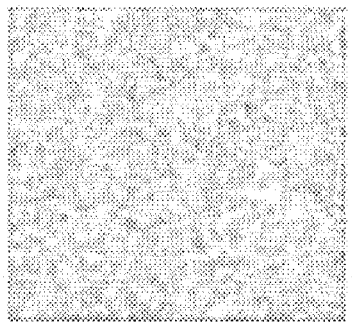
Figure 10C:
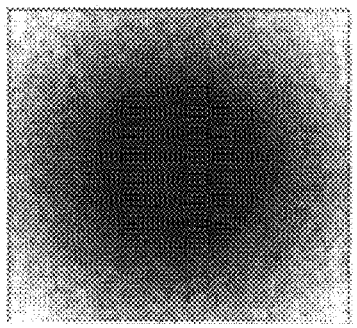

FIGS. 10A to 10C illustrate examples of simulation results indicating how dust adhering to portions of an imaging optical system are captured in images. FIGS. 10A to 10C expect a black dot having a diameter of about 50 μm as dust adhering to each portion of the imaging optical system. FIG. 10A is a case where dust adheres to the negative lens (first lens) L1 located on the most object side. FIG. 10B is a case where dust adheres to the variable aperture stop AS, BS. FIG. 10C is a case where dust adheres to the image sensor AI, BI. The dust appears with the largest size in FIG. 10C. The dust appears with a size second to the largest in FIG. 10A. The dust appears with the smallest size in FIG. 10B. Thus, the location for installing the infrared-absorbing filter is desirably near the variable aperture stop AS, BS also by taking into account convenience of management.

Figure 11:
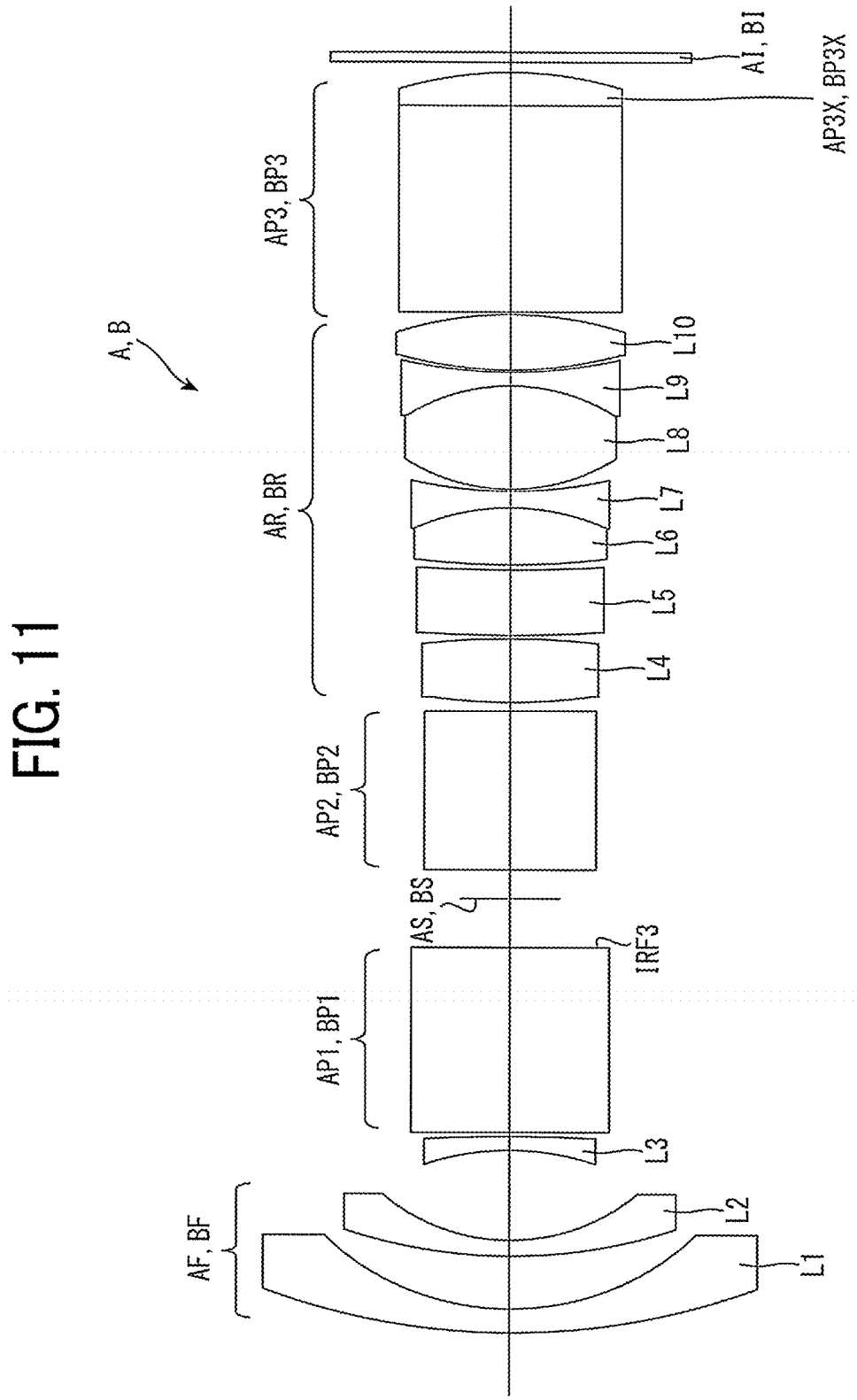
FIG. 11 illustrates an example when an infrared-absorbing filter is provided in the lens development diagram of FIG. 4.

FIG. 11 illustrates an example when an infrared-absorbing filter is provided in the lens development diagram of FIG. 4. In FIG. 11, the infrared-absorbing filter IRF3 is provided on the surface on the image side (an emission surface that is a flat surface) of each of the first prisms AP1 and BP1. The installation portion is determined based on that light rays are gently incident at the location, the location is direct front of the variable aperture stop AS, BS and the light rays are thick, the variable aperture stop AS, BS is located in rear (directly in rear) of the infrared-absorbing filter because of the wide-angle system, valid regions of incidence and emission to and from the first prism AP1, BP1 (parallel-plane glass) differ from each other, and a margin amount of the first prism AP1, BP1 at installation with an adhesive or the like can be largely ensured (that is, the installation location is a location where such merits can be attained).

In other words, light rays are emitted from the front group AF, BF such that wide-angle light is converged, and the light rays are incident on the variable aperture stop AS, BS. Thus, the ray transmission value on the incident side is larger than the ray transmission value on the emission side. In this case, since the outside diameter of the first prism AP1, BP1 (parallel-plane glass) is determined based on the large effective value, and the margin amount on the emission side of the first prism AP1, BP1 inevitably increases.

Figure 12:
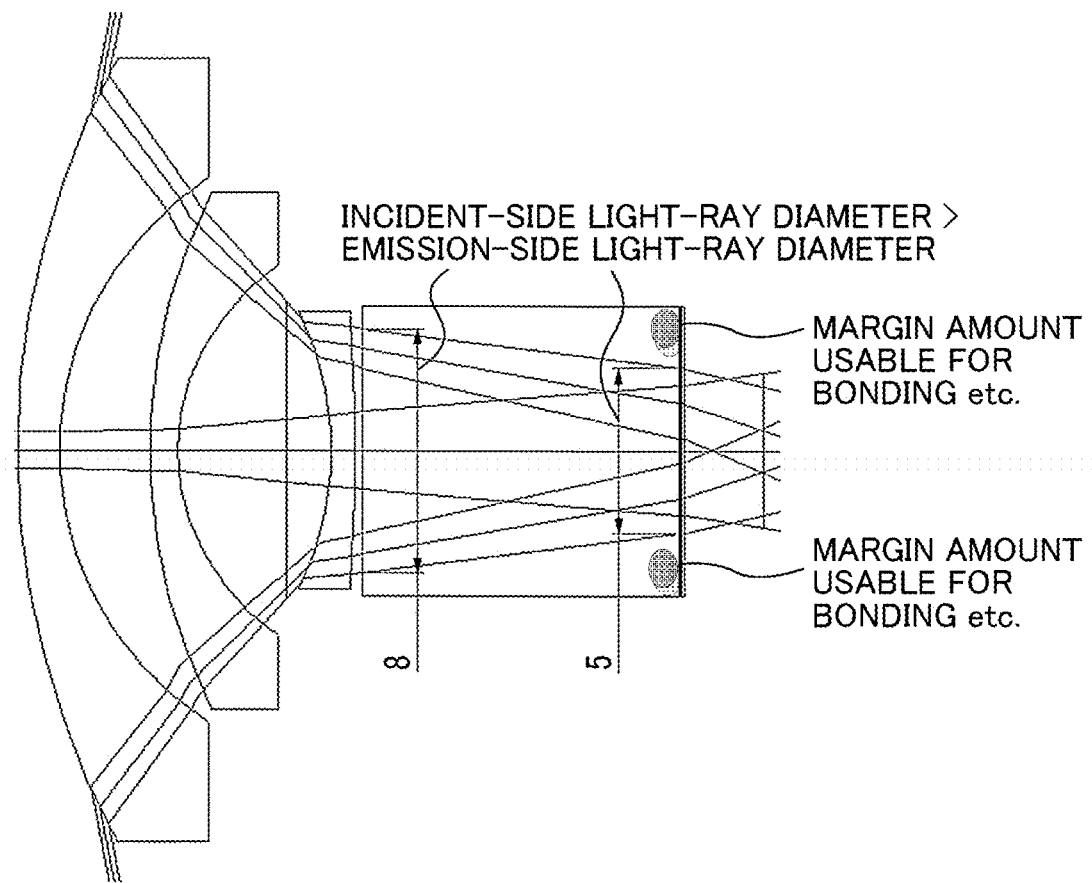
FIG. 12 is a diagram presenting an example of light-ray diameters on an incident side and an emission side of a first prism.
Figure 13A:
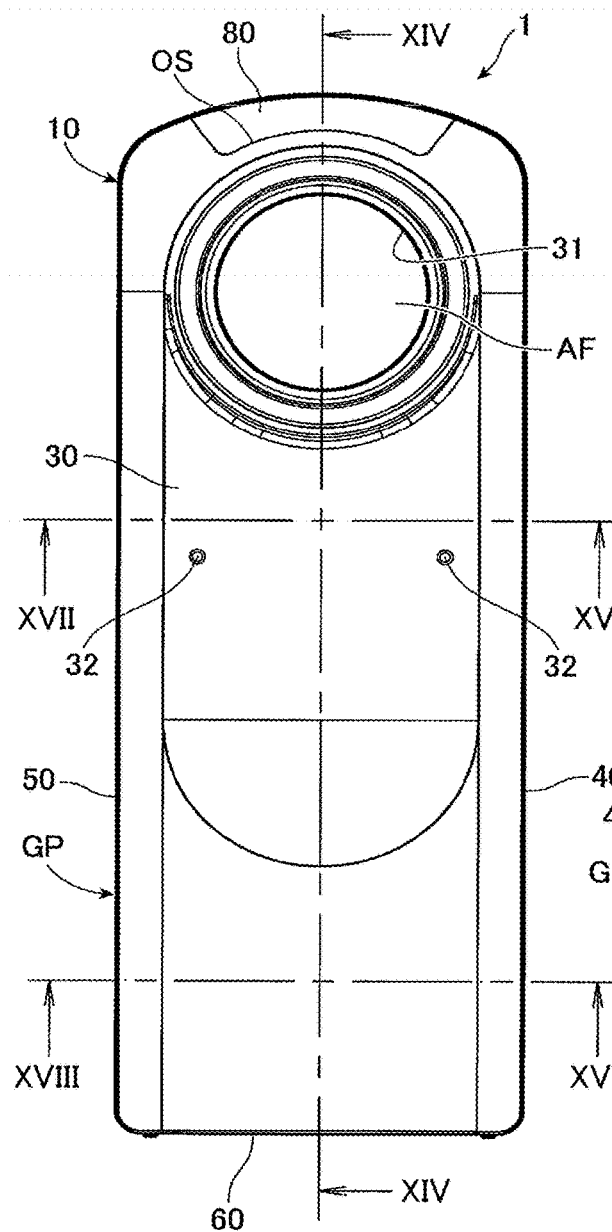
FIGS. 13A and 13B are external configuration views of an imaging system when viewed from front and rear (front view, rear view)
Figure 13B:
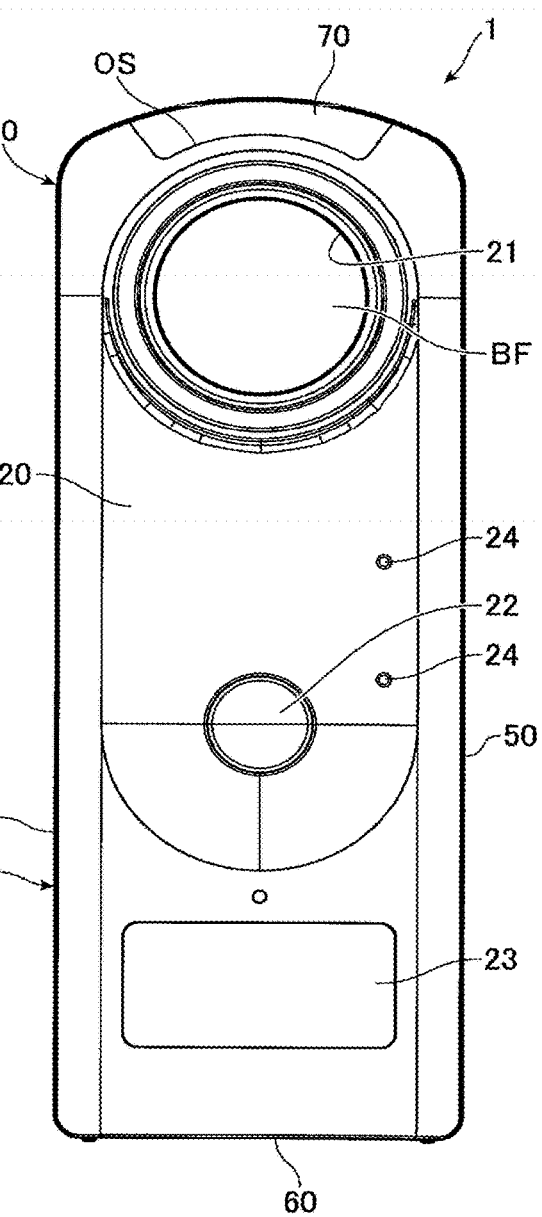
Figure 15A:
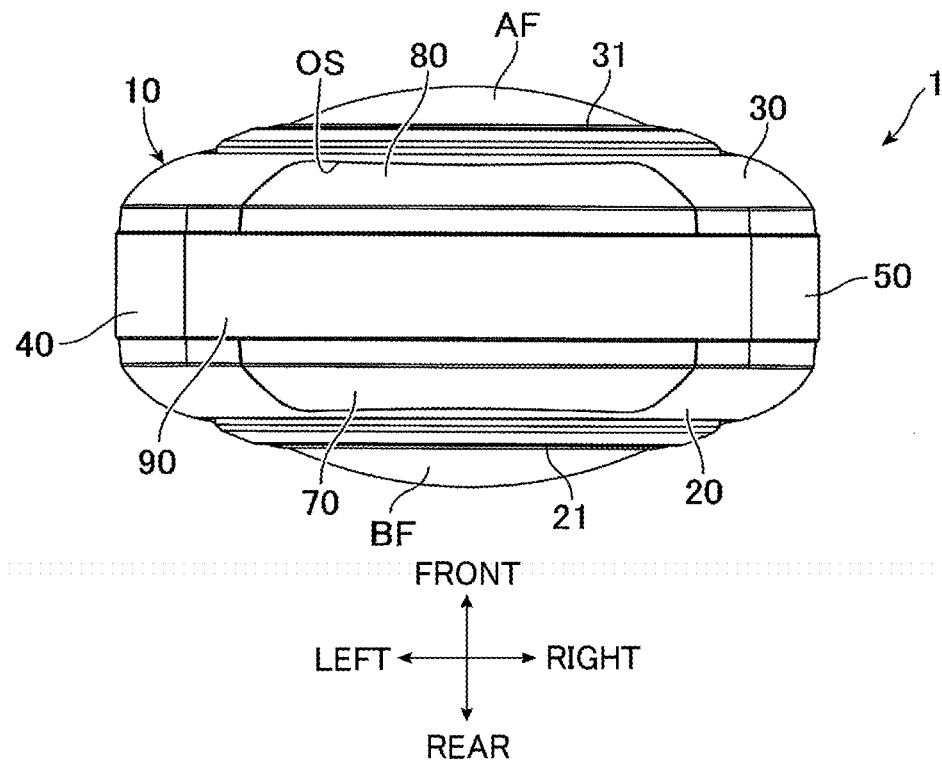
FIGS. 15A and 15B are external configuration views of the imaging system when viewed from above and below (plan view, bottom view)
Figure 15B:
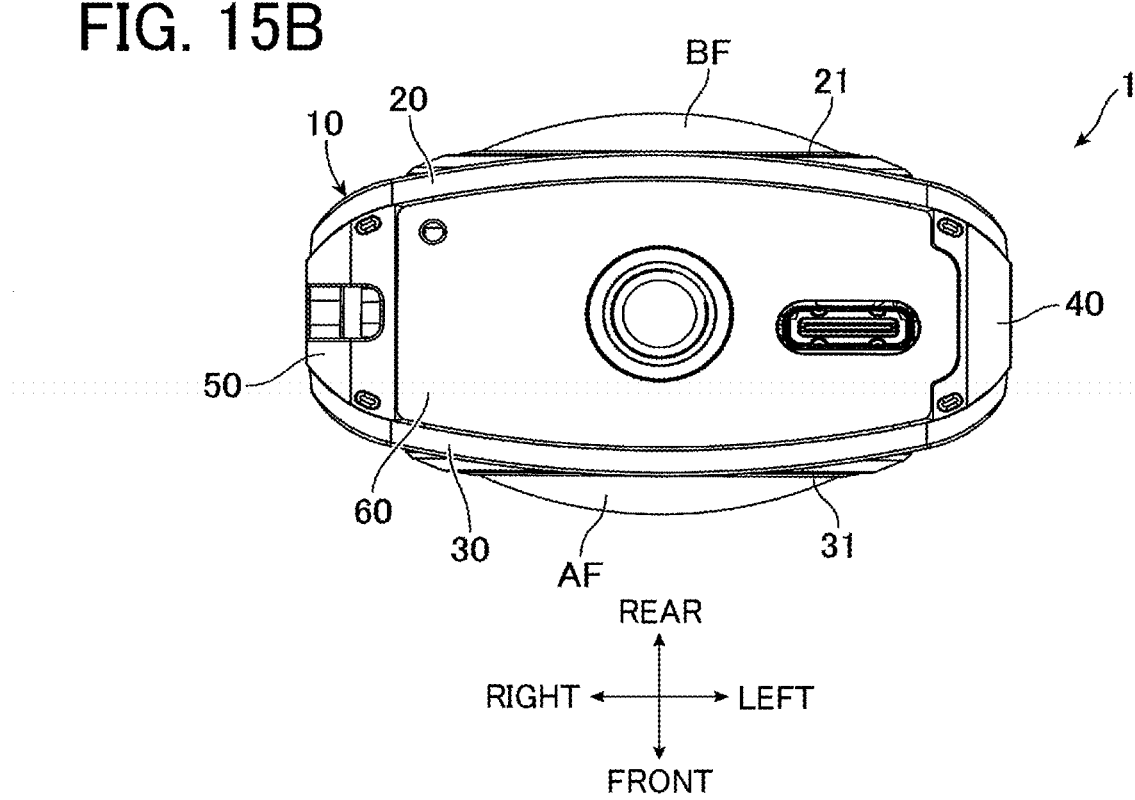

FIG. 12 illustrates an example of light-ray diameters on the incident side and the emission side of each of the first prisms AP1 and BP1 (parallel-plane glasses). As illustrated in FIG. 12, the light-ray diameter on the incident side (for example, 8 mm) of the first prism AP1, BP1 (parallel-plane glass) is larger than the light-ray diameter on the emission side (for example, 5 mm) of the first prism AP1, BP1 (parallel-plane glass). The margin amount on the emission side can be largely ensured. Hence, attachment with an adhesive or the like can be easily performed by using the difference (margin amount) between the light-ray diameters on the incident side and the emission side.

By the reason like the one described above, the infrared-absorbing filter IRF3 can be provided on a surface on the object side (an incident surface that is a flat surface) of the second prism AP2, BP2.

While the case has been exemplarily described where the first infrared-cut filter IRF1 and the second infrared-cut filter IRF2 are provided (coating is applied) by vapor deposition or the like in the above-described embodiment, the method of providing the first infrared-cut filter IRF1 and the second infrared-cut filter IRF2 have a certain degree of freedom, and the design can be changed in various ways. For example, an aspect of providing (applying coating with) the first infrared-cut filter IRF1 and the second infrared-cut filter IRF2 by a method other than vapor deposition can be employed.

While the case has been exemplarily described where the two wide-angle lens systems A and B are included in the imaging system 1 in the above-described embodiment, the number of wide-angle lens systems included in the imaging system 1 is not limited to two, and may be three or more. In this case, the number of image sensors included in the imaging system 1 may be the same as the number of wide-angle lens systems. At least two wide-angle lens systems among the three or more wide-angle lens systems each may be provided with an object-side filter and an image-side filter having spectral characteristics different from each other, and a wavelength of light for which a spectral transmittance and a spectral reflectance of the object-side filter are 50% may be longer than a wavelength of light for which a spectral transmittance and a spectral reflectance of the image-side filter are 50%.

While the case has been exemplarily described where the prism is used as the reflector in the above-described embodiment, the reflector may be a mirror or any of other components.

While the case has been exemplarily described where the two wide-angle lens systems A and B are arranged symmetrically to each other and the two image sensors AI and BI are arranged symmetrically to each other in the above-described embodiment, the two wide-angle lens systems A and B may be asymmetrically arranged and the two image sensors AI and BI may be asymmetrically arranged.

A general arrangement when the imaging system 1 according to this embodiment is applied to a spherical imaging system is described with reference to FIGS. 13A to 20.

As illustrated in six-side drawings of FIGS. 13A, 13B, 14A, 14B, 15A, and 15B, the imaging system 1 includes a casing 10 that is assembled with components of the imaging system 1 and that holds the components. The casing 10 is short in the left-right direction, is long in the up-down direction, has a certain thickness in the front-rear direction, and has an upper surface with a rounded outline. The casing 10 includes a rear metal casing 20 and a front metal casing 30. The rear metal casing 20 and the front metal casing 30 can be an integrally molded product constituted of a metal material (for example, a magnesium alloy) with relatively high stiffness as compared with the stiffness of a rear resin casing 70, a front resin casing 80, and a coupling resin casing 90 (described later).

The rear metal casing 20 and the front metal casing 30 are coupled to each other using the left-side-surface coupling casing 40, a right-side-surface coupling casing 50, and a lower-surface coupling casing 60. The left-side-surface coupling casing 40, the right-side-surface coupling casing 50, and the lower-surface coupling casing 60 can be constituted of, for example, the same metal material as the metal material of the rear metal casing 20 and the front metal casing 30; however, the material has a certain degree of freedom and the design can be changed in various ways.

A positioning boss (not illustrated) is formed at one of the rear metal casing 20 and the front metal casing 30. A boss insertion hole (not illustrated) is formed in the other of the rear metal casing 20 and the front metal casing 30. The positioning boss is inserted into the boss insertion hole to position the rear metal casing 20 and the front metal casing 30 in a closely arranged state or an adjacent state. The rear metal casing 20 and the front metal casing 30 have screw holes (not illustrated) at left side surfaces, right side surfaces, and lower surfaces, so as to overlap each other in the positioned state and to receive screws to fasten the rear metal casing 20 and the front metal casing 30 together.

The left-side-surface coupling casing 40, the right-side-surface coupling casing 50, and the lower-surface coupling casing 60 are fitted to gaps among the left side surfaces, the right side surfaces, and the lower surfaces of the rear metal casing 20 and the front metal casing 30. Screws (not illustrated) are inserted into and screwed (fastened) to the screw holes. Hence the rear metal casing 20, the front metal casing 30, the left-side-surface coupling casing 40, the right-side-surface coupling casing 50, and the lower-surface coupling casing 60 are integrated. The configuration for integrating the rear metal casing 20, the front metal casing 30, the left-side-surface coupling casing 40, the right-side-surface coupling casing 50, and the lower-surface coupling casing 60 has a certain degree of freedom, and the design can be changed in various ways.

A substantially circular lens exposure hole 21 is formed in an upper portion of the rear metal casing 20. A substantially circular lens exposure hole 31 is formed in an upper portion of the front metal casing 30. The front group AF of the wide-angle lens system A is exposed via the lens exposure hole 21. The front group BF of the wide-angle lens system B is exposed via the lens exposure hole 31. A shutter button (imaging function unit, operation unit) 22 is provided slightly below an intermediate portion in the up-down direction of the rear metal casing 20. The shutter button 22 serves as a trigger for image capturing (still-image capturing, movie capturing). A display unit (imaging unction unit, state display unit) 23 is provided below the shutter button 22. The display unit 23 displays various information, such as an operation window, a setting window, and so forth, of the imaging system 1. The display unit 23 can be constituted of, for example, an organic electroluminescent (EL) display.

A speaker (imaging function unit) 41 is provided in an intermediate portion in the up-down direction of the left-side-surface coupling casing 40. The speaker 41 outputs, for example, a voice guide message. A power button (imaging function unit, operation unit) 51 is provided in an intermediate portion in the up-down direction of the right-side-surface coupling casing 50. The power button 51 turns ON and OFF the power of the imaging system 1. Operation buttons (imaging function unit, operation unit) 52, 53, and 54 are provided below the power button 51. The operation buttons 52, 53, and 54 are for setting operation of an imaging mode and a wireless connection mode.

Two microphones (imaging function unit, sound collector) 24 that are separated from each other in the up-down direction are provided slightly above and right of the shutter button 22 of the rear metal casing 20. Two microphones (imaging function unit, sound collector) 32 that are separated from each other in the left-right direction are provided slightly above an intermediate portion in the up-down direction of the front metal casing 30. The two microphones 24 of the rear metal casing 20 and the two microphones 32 of the front metal casing 30, the microphones 24 and 32 which are four microphones in total and located front and back, can acquire three-dimensional (3D) sound.

A coupled body of the rear metal casing 20, the front metal casing 30, the left-side-surface coupling casing 40, the right-side-surface coupling casing 50, and the lower-surface coupling casing 60 constitute a grip GP in a portion below an intermediate portion in the up-down direction of the coupled body. A user who captures an image can press any of the shutter button 22, the power button 51, and the operation buttons 52 to 54 while holding the grip GP.

The coupled body of the rear metal casing 20, the front metal casing 30, the left-side-surface coupling casing 40, the right-side-surface coupling casing 50, and the lower-surface coupling casing 60 has an opening OS that is open to the upper side. The opening OS is closed with the rear resin casing 70, the front resin casing 80, and the coupling resin casing 90. The rear resin casing 70, the front resin casing 80, and the coupling resin casing 90 can be an integrally molded product constituted of a resin material (for example, one of a polycarbonate (PC) resin, an acrylonitrile butadiene styrene (ABS) resin, and a mixed material of these resins) with relatively low stiffness as compared with the stiffness of the rear metal casing 20 and the front metal casing 30.

The rear resin casing 70 has a curved shape that is fitted to a curved cutout portion of the opening OS formed in the upper portion of the rear metal casing 20. The front resin casing 80 has a curved shape that is fitted to a curved cutout portion of the opening OS formed in the upper portion of the front metal casing 30. The rear resin casing 70 and the front resin casing 80 have symmetrical shapes facing the opposite sides in the front-rear direction. The coupling resin casing 90 has a curved shape that is fitted to a portion between the rear resin casing 70 and the front resin casing 80 of the opening OS formed in the upper portions of the rear metal casing 20 and the front metal casing 30.

A pair of protruding portions having screw holes are provided slightly above the lens exposure hole 21 of the rear metal casing 20 and are separated from each other in the left-right direction. A pair of screw insertion holes are formed in the rear resin casing 70, and correspond to the pair of protruding portions with screw holes. The pair of protruding portions with screw holes are aligned with the pair of screw insertion holes, a pair of fastening screws are inserted into the pair of screw insertion holes, and the pair of fastening screws are screwed (fastened) to the screw holes of the pair of protruding portions with screw holes. Thus, the rear metal casing 20 and the rear resin casing 70 are coupled to each other. While the coupling structure between the rear metal casing 20 and the rear resin casing 70 is described above, the coupling structure between the front metal casing 30 and the front resin casing 80 is similar to the above-described coupling structure.

The wide-angle lens systems A and B (including the first to third prisms AP1 to AP3 and BP1 to BP3) configured as described above and the image sensors AI and BI are integrated (unitized in a block) as an imaging unit (optical unit) 100. A screw hole (not illustrated) is formed in the imaging unit 100. In a state in which the imaging unit 100 is housed in the casing 10 (the coupled body of the rear metal casing 20, the front metal casing 30, the left-side-surface coupling casing 40, the right-side-surface coupling casing 50, and the lower-surface coupling casing 60), co-fastening screws (not illustrated) inserted through the casings are screwed (fastened) to the screw holes. Thus the imaging unit 100 is assembled. The configuration for assembling the imaging unit 100 with the casing 10 has a certain degree of freedom, and the design can be changed in various ways.

FIGS. 16A and 16B illustrate the positional relationship between the casing 10 and the imaging unit 100 when the casing 10 is assembled with the imaging unit 100. FIGS. 16A and 16B illustrate a region occupied by the imaging unit 100 in the housing 10 in an enhanced manner using a thick line.

Figure 17:
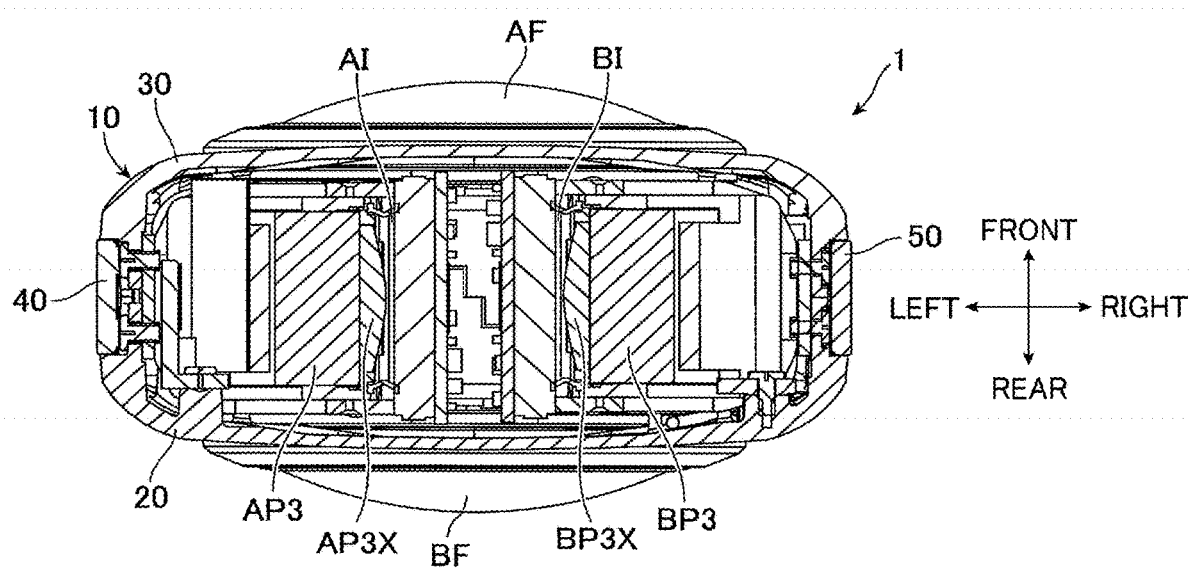
FIG. 17 is a sectional view taken through line XVII-XVII in FIG. 13A.
Figure 18:
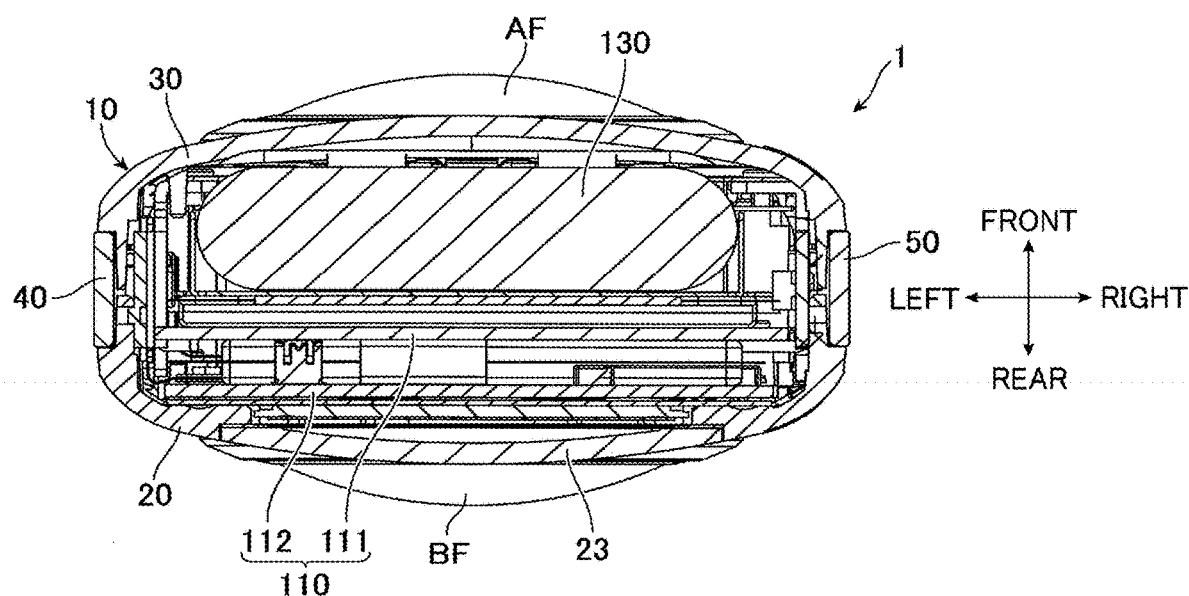
FIG. 18 is a sectional view taken through line XVIII-XVIII in FIG. 13A.
Figure 19:
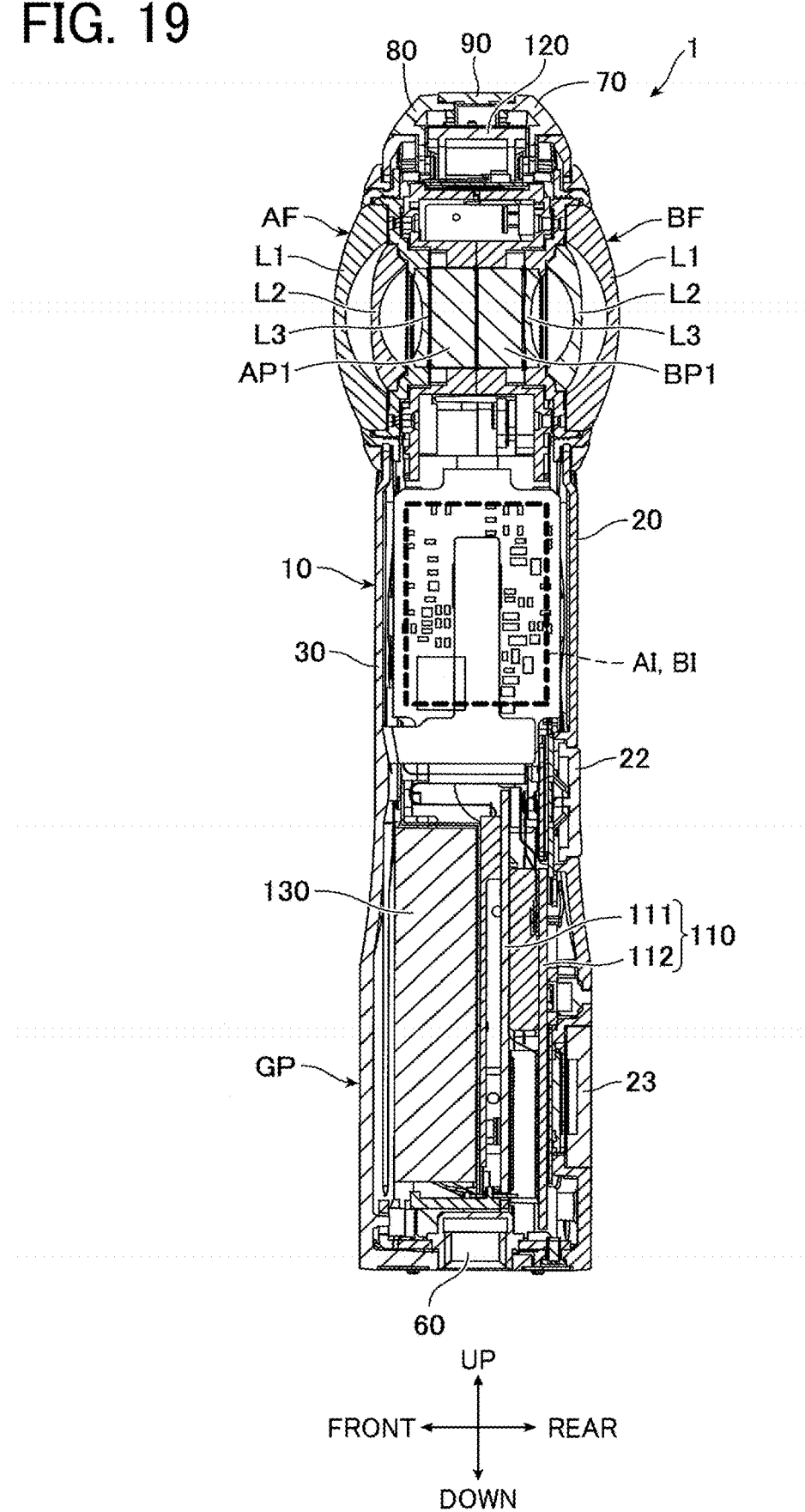
FIG. 19 is a sectional view taken through line XIV-XIV in FIG. 13A.

As illustrated in FIGS. 16A and 16B, the housing 10 holding the imaging unit 100 is divided into a holding region for the imaging unit 100 located at an upper position, and a non-holding region for the imaging unit 100 located at a lower position in a view in the up-down direction. A portion of the imaging unit 100 allows a front lens (for example, the negative lens L1) of each of the front groups AF and BF, which are at least portions of the optical systems A and B, to be exposed, and defines the maximum external portion excluding the exposed portion. In FIGS. 16A and 16B, w denotes a width (a length in the left-right direction) of the imaging unit 100 at the maximum external portion, and d denotes a thickness (a length in the front-rear direction) of the imaging unit 100 at the maximum external portion. FIGS. 17, 18, and 19 are sectional views respectively taken through line XVII-XVII, line XVIII-XVIII, and line XIV-XIV in FIG. 13A.

As illustrated in FIGS. 18 and 19, a wireless module board (imaging function unit, circuit board) 110 is held (housed) in the non-holding region for the imaging unit 100 of the housing 10. The wireless module board 110 converts imaging signals of the image sensors AI and BI into wireless signals. The wireless module board 110 includes a sub-board 111 located on the front side and a main board 112 located on the rear side in a manner superposed on each other in the front-rear direction and coupled to each other such that the sub-board 111 and the main board 112 are electrically coupled to each other. The sub-board 111 has a relatively small substantially rectangular shape in a plan view. The main board 112 has a relatively large substantially rectangular shape in a plan view. A transmission member (not illustrated) is attached to the main board 112. The transmission member extends upward toward the inner space of the rear resin casing 70, the front resin casing 80, and the coupling resin casing 90. The transmission member can be constituted of a coaxial cable or a flexible printed circuit (FPC).

As illustrated in FIG. 19, a communication antenna (imaging function unit, antenna board) 120 is provided in the inner space of the rear resin casing 70, the front resin casing 80, and the coupling resin casing 90. One end portion of the transmission member is coupled to the main board 112 and the other end portion of the transmission member is coupled to the communication antenna 120. The transmission member transmits imaging signals of the image sensors AI and BI to the communication antenna 120, and the communication antenna 120 wirelessly transmits the imaging signals to an external device. The communication antenna 120 can transmit and receive various signals to and from the external device.

Although not illustrated, the communication antenna 120 includes an antenna main body, and an antenna board that holds the antenna main body. The antenna main body can be constituted of, for example, a FPC or a rigid FPC. The antenna board has a curved shape (arcuate shape) along the shape of the opening OS formed in the upper surface of the housing 10 (the rear metal casing 20, the front metal casing 30, the left-side-surface coupling casing 40, the right-side-surface coupling casing 50, and the lower-surface coupling casing 60). The other end portion of the transmission member is coupled to an upper surface of the curved shape, and the antenna main body is bonded to the upper surface of the curved portion.

As illustrated in FIGS. 18 and 19, a battery 130 is held (housed) in the non-holding region for the imaging unit 100 of the housing 10. The battery 130 supplies electric power to components of the imaging system 1. The position in the up-down direction of the battery 130 overlaps the position of the wireless module board 110, and the battery 130 is provided on the front side with respect to the wireless module board 110. The image sensors AI and BI each are provided at a position not overlapping the lens L1 located on the most object side when viewed in the direction along the axis of incident light incident on the lens L1 located on the most object side. Components of the wireless module board 110, the communication antenna 120, the battery 130, and so forth, are provided in the other region. With this configuration, the imaging unit 100 can be minimized in size in the up-down direction, the left-right direction, and the front-rear direction of the imaging unit 100.

FIG. 20 illustrates an example of a hardware configuration of the imaging system 1 according to this embodiment. The imaging system 1 includes a digital still camera processor (hereinafter, merely referred to as processor) 100Z, a lens barrel unit 102Z, and various components coupled to the processor 100Z. The lens barrel unit 102Z includes the above-described two pairs of lens optical systems 20AZ and 20BZ, and solid-state image sensors 22AZ and 22BZ. The solid-state image sensor 22Z is controlled under a control command from a central processing unit (CPU) 130Z (described later) in the processor 100Z.

The processor 100Z includes image signal processors (ISPs) 108AZ and 108BZ, a direct memory access controller (DMAC) 110Z, an arbiter (arbiter memory controller, ARB- MEMC) 112Z for arbitration of memory access, a memory controller (MEMC) 114Z for control of memory access, and a distortion correction/image composite block 118Z. The ISPs 108AZ and 108BZ perform white-balance setting and gamma setting on image data input through signal processing by the solid-state image sensors 22AZ and 22BZ. The MEMC 114Z is coupled to a synchronous dynamic random access memory (SDRAM) 116Z. The SDRAM 116Z temporarily stores data when to be processed by the ISPs 108AZ and 108BZ and the distortion correction/image composite block 118Z. The distortion correction/image composite block 118Z performs distortion correction and top and bottom correction on two partial images obtained from the two imaging optical systems, using information from a three-axis acceleration sensor 120Z, and composites the images.

The processor 100Z further includes a DMAC 122Z, an image processing block 124Z, the CPU 130Z, an image data transmitter 126Z, an SDRAM controller (SDRAMC) 128Z, a memory card control block 140Z, a universal serial bus (USB) block 146Z, a peripheral block 150Z, a voice unit 152Z, a serial block 158Z, a liquid crystal display (LCD) driver 162Z, and a bridge 168Z.

The CPU 130Z controls operation of components of the imaging system 1. The image processing block 124Z performs various image processing on image data using a resize block 132Z, a Joint Photographic Experts Group (JPEG) block 134Z, an H. 264 block 136Z, and so forth. The resize block 132Z is a block for increasing or decreasing the size of the image data through interpolation processing. The JPEG block 134Z is a codec (coder-decoder) block that performs JPEG compression and expansion. The H. 264 block 136Z is a codec block that performs movie compression and expansion of, for example, H. 264. The image data transmitter 126Z transmits an image on which the image processing has been performed by the image processing block 124Z. An SDRAMC 128Z controls an SDRAM 138Z coupled to the processor 100Z. The SDRAM 138Z temporarily stores image data when various processing is performed on the image data in the processor 100Z.

The memory card control block 140Z controls reading and writing from and in a memory card inserted into a memory card slot 142Z, or a flash ROM 144Z. The memory card slot 142Z is a slot through which the memory card is removably inserted into the imaging system 1. The USB block 146Z controls USB communication with respect to an external device such as a personal computer that is coupled through a USB connector 148Z. A power switch 166Z is coupled to the peripheral block 150Z. The voice unit 152Z is coupled to a microphone 156Z that receives a voice signal input by a user, and a speaker 154Z that outputs a recorded voice signal. The voice unit 152Z controls input and output of voice. The serial block 158Z controls serial communication with respect to an external device such as a personal computer. A wireless network interface card (NIC) 160Z is coupled to the serial block 158Z. The LCD driver 162Z is a drive circuit that drives an LCD monitor 164Z, and performs conversion into signals for displaying various states on the LCD monitor 164Z.

The flash ROM 144Z stores a control program and various parameters written in codes that can be decoded by the CPU 130Z. When the power switch 166Z is operated and the power is turned ON, the control program is loaded into the main memory. The CPU 130Z controls operation of components of the apparatus in accordance with the program read in the main memory, and temporarily stores data required for the control in the SDRAM 138Z and a local static random access memory (SRAM) (not illustrated).

Further, in this disclosure, the spherical image does not have to be the full-view spherical image of a full 360 degrees in the horizontal direction. For example, the spherical image may be a wide-angle view image having an angle of anywhere from 180 to any amount less than 360 degrees in the horizontal direction.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. An imaging optical system, comprising:
   a first optical system and a second optical system, each of the first optical system and the second optical system including:
   a first prism,
   a second prism,
   an object-side filter positioned on an image-side surface of the first prism, and
   an image-side filter positioned on an image-side surface of the second prism, wherein
   the object-side filter and the image-side filter have different spectral characteristics such that a wavelength of light for which the object-side filter has a spectral transmittance and a spectral reflectance of 50% is longer than a wavelength of light for which the image-side filter has a spectral transmittance and a spectral reflectance of 50%.

2. The imaging optical system according to claim 1, wherein the first and second optical systems are arranged symmetrically to each other.

3. The imaging optical system according to claim 1, wherein at least one of the image-side surface of the first prism and the image-side surface of the second prism is a flat surface.

4. The imaging optical system according to claim 1, wherein both of the image-side surface of the first prism and the image-side surface of the second prism are flat surfaces.

5. The imaging optical system according to claim 1, wherein
   the first prism is a first reflector,
   the second prism is a second reflector, and
   the first and second optical systems each include, from an object side toward an image side, a front group and a rear group, and
   the first reflector and the second reflector are configured to change an optical path between the front group and the rear group.

6. The imaging optical system according to claim 5, wherein the first and second optical systems each include a variable aperture stop that is arranged between the first reflector and the second reflector.

7. The imaging optical system according to claim 1, wherein the object-side filter and the image-side filter each have a spectral reflectance of 50% or more and a spectral transmittance of 50% or less for light with wavelengths of 650 nm or longer.

8. The imaging optical system according to claim 1, wherein
   the object-side filter has a spectral reflectance of 50% or more for light with wavelengths of 750 nm or longer, and the image-side filter has a spectral reflectance of 50% or more for light with wavelengths of 650 nm or longer.

9. An imaging system, comprising:
a first optical system;
a second optical system; and
a first image sensor and a second image sensor, each configured to form an image captured by a corresponding optical system of the two optical systems first and second optical systems, wherein
each of the first optical system and the second optical system includes:
a first prism,
a second prism,
an object-side filter positioned on an image-side surface of the first prism, and
an image-side filter positioned on an image-side surface of the second prism, wherein
the object-side filter and the image-side filter have different spectral characteristics such that a wavelength of light for which the object-side filter has a spectral transmittance and a spectral reflectance of 50% is longer than a wavelength of light for which the image-side filter has a spectral transmittance and a spectral reflectance of 50%.

10. An imaging apparatus, comprising:
a first optical system;
a second optical system;
a first image sensor on which images via the first optical system are formed;
a second image sensor on which images via the second optical system are formed; and
a casing holding the first and second optical systems and the first and second image sensors, wherein
each of the first optical system and the second optical system includes:
a first prism,
a second prism,
an object-side filter positioned on an image-side surface of the first prism, and
an image-side filter positioned on an image-side surface of the second prism, and
the object-side filter and the image-side filter have different spectral characteristics such that a wavelength of light for which the object-side filter has a spectral transmittance and a spectral reflectance of 50% is longer than a wavelength of light for which the image-side filter has a spectral transmittance and a spectral reflectance of 50%.

11. The imaging optical system according to claim 5, wherein the first reflector and the second reflector are positioned between the front group and the rear group.

12. The imaging system according to claim 9, wherein the first prism is a first reflector,
the second prism is a second reflector, and
the first and second optical systems each include, from an object side toward an image side, a front group and a rear group, and
the first reflector and the second reflector are configured to change an optical path between the front group and the rear group.

13. The imaging system according to claim 12, wherein the first reflector and the second reflector are positioned between the front group and the rear group.

14. The imaging system according to claim 9, wherein the first and second optical systems each include a variable aperture stop that is arranged between the first reflector and the second reflector.

15. The imaging system according to claim 9, wherein the object-side filter and the image-side filter each have a spectral reflectance of 50% or more and a spectral transmittance of 50% or less for light with wavelengths of 650 nm or longer.

16. The imaging system according to claim 9, wherein
the object-side filter has a spectral reflectance of 50% or more for light with wavelengths of 750 nm or longer, and
the image-side filter has a spectral reflectance of 50% or more for light with wavelengths of 650 nm or longer.

17. The imaging apparatus according to claim 10, wherein the first prism is a first reflector,
the second prism is a second reflector, and
the first and second optical systems each include, from an object side toward an image side, a front group and a rear group, and
the first reflector and the second reflector are configured to change an optical path between the front group and the rear group.

18. The imaging apparatus according to claim 17, wherein the first reflector and the second reflector are positioned between the front group and the rear group.

19. The imaging apparatus according to claim 10, wherein the object-side filter and the image-side filter each have a spectral reflectance of 50% or more and a spectral transmittance of 50% or less for light with wavelengths of 650 nm or longer.

20. The imaging apparatus according to claim 10, wherein
the object-side filter has a spectral reflectance of 50% or more for light with wavelengths of 750 nm or longer, and
the image-side filter has a spectral reflectance of 50% or more for light with wavelengths of 650 nm or longer.

* * * * *